(12) United States Patent
Brown et al.

(10) Patent No.: US 7,804,947 B2
(45) Date of Patent: Sep. 28, 2010

(54) METHOD AND APPARATUS FOR VALIDATION AND ERROR RESOLUTION OF CONFIGURATION DATA IN A PRIVATE BRANCH EXCHANGE SWITCH

(75) Inventors: Deborah J. Brown, Red Bank, NJ (US); Raji Chinnappa, Allentown, NJ (US); Prameela R. Gopu, Morganville, NJ (US); Timothy I. Ross, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1292 days.

(21) Appl. No.: 10/851,771

(22) Filed: May 21, 2004

(65) Prior Publication Data

US 2005/0259590 A1    Nov. 24, 2005

(51) Int. Cl.
*H04M 3/42* (2006.01)
(52) U.S. Cl. ................ 379/201.12; 370/216; 370/351; 370/352; 379/9.02; 379/9.03; 379/15.03; 379/201.01; 379/227; 709/201; 709/202; 709/203; 709/220; 709/221
(58) Field of Classification Search ......... 370/351–356, 370/216; 379/9–9.04, 32.01, 201.01, 201.12, 379/225–227, 15.03; 709/201–203, 220–221; 717/168–178; 455/418–420, 426.2, 554.1–555; 707/690–692, 694, 701–703
See application file for complete search history.

(56) References Cited

U.S. PATENT DOCUMENTS 5,023,873 A * 6/1991 Stevenson et al. ............ 714/4

5,742,672 A * 4/1998 Burk ...................... 379/201.12

(Continued)

OTHER PUBLICATIONS

Ada Che, "CA Application No. 2,503,757 Office Action Oct. 5, 2007",, Publisher: CIPO, Published in: CA.

(Continued)

*Primary Examiner*—Hemant Patel
(74) *Attorney, Agent, or Firm*—Joseph B. Ryan; Jason Paul DeMont; Wayne S. Breyer

(57) ABSTRACT

Methods and apparatus are provided for validating configuration data in a switch. An error is detected if the configuration data fails to comply with one or more rules; and a user is presented with an interface that allows the user to correct the error. The rules may include one or more syntactic rules or conflict rules (or both). In the case of a simple error, the user is presented with an error indication with a smart error link. In the case of a conflict error, the user is presented with an error indication that identifies the conflicting endpoints and optionally allows the user to correct at least one conflicting endpoint. The configuration data is revalidated after a change is made by a user. Changes are propagated to affected data objects. A number of error types may be automatically updated. When an objects inherit properties through application of a template to the data object, a list is maintained of the data objects associated with each template, so that the associated data objects can be updated if the template is updated. Errors information can be presented to the user in a hierarchical error tree. The user can select errors from the tree to be corrected. The error tree can optionally be redisplayed following a change by validating only affected elements.

12 Claims, 18 Drawing Sheets

U.S. PATENT DOCUMENTS

| | | | |
|---|---|---|---|
| 5,793,751 A * | 8/1998 | Baker et al. | 370/250 |
| 5,802,142 A * | 9/1998 | Browne | 379/28 |
| 5,945,990 A * | 8/1999 | Morrison et al. | 715/748 |
| 6,085,335 A * | 7/2000 | Djoko et al. | 714/26 |
| 6,259,911 B1 | 7/2001 | Bims et al. | |
| 6,363,065 B1 * | 3/2002 | Thornton et al. | 370/352 |
| 6,477,245 B1 * | 11/2002 | Chevet et al. | 379/201.03 |
| 6,639,980 B1 | 10/2003 | Weiss et al. | |
| 6,671,818 B1 * | 12/2003 | Mikurak | 714/4 |
| 6,754,181 B1 * | 6/2004 | Elliott et al. | 370/252 |
| 7,012,997 B1 * | 3/2006 | Mednieks | 379/88.04 |
| 7,440,566 B2 * | 10/2008 | Masuhiro et al. | 379/221.04 |
| 2002/0168054 A1 * | 11/2002 | Klos et al. | 379/1.04 |
| 2004/0019662 A1 | 1/2004 | Viswanath et al. | |
| 2004/0052343 A1 * | 3/2004 | Glaser et al. | 379/88.22 |
| 2005/0273464 A1 * | 12/2005 | Brown et al. | 707/100 |
| 2005/0278349 A1 * | 12/2005 | Chinnappa et al. | 707/100 |
| 2006/0153174 A1 * | 7/2006 | Towns-von Stauber et al. | 370/356 |

OTHER PUBLICATIONS

Kang et al., "Feature-Oriented Engineering of PBX Software for Adaptability and Reuseability", "Software—Practice and Experience XP000834574", 1999, pp. 875-896, vol. 29, No. 10, Publisher: John Wiley & Sons, Ltd.

Ada Che, "CA Application No. 2,503,757 Office Action Aug. 12, 2008", , Publisher: CIPO, Published in: CA.

Vercauteren, Steven, "EP Application No. 05253129.0—1249 European Search Report Sep. 14, 2009", , Publisher: EPO, Published in: EP.

Che, Ada, "CA Application No. 2,503,757 Office Action Jul. 12, 2010", , Publisher: CIPO, Published in: CA.

* cited by examiner

FIG. 4

| USER FIELD | RULE/CONSTRAINT |
|---|---|
| NAME | 1. SYNTAX RULE<br>MUST BE SYNTACTICALLY CORRECT: HERE SYNTAX RULE IS THAT THE FIELD CAN BE UP TO 16 ALPHANUMERIC CHARACTERS LONG. IT CANNOT BE EMPTY AND IT CANNOT START WITH A NUMBER. IT CANNOT CONTAIN CHARACTERS OTHER THAN ALPHABETS AND NUMBERS AND SPACES. IT CANNOT ESPECIALLY CONTAIN A ",", -SPECIAL ERROR FOR THIS CHARACTER VERSUS OTHERS. THE EXCEPTIONS FOR THE SYNTAX RULE ARE SPECIAL NAMES LIKE "FR_link" WHICH IS CONSIDERED VALID.<br>1. UNIQUENESS RULES:<br>MUST BE UNIQUE IN SYSTEM: ACROSS USER FULL NAME, ANOTHER USER'S NAME OR FULL NAME, ANY HUNT GROUP NAME, AND OTHER SIMILAR FIELDS THROUGHOUT SYSTEM. |
| FULL NAME | 1. SYNTAX RULE<br>MUST BE SYNTACTICALLY CORRECT: HERE SYNTAX RULE IS THAT THE FIELD CAN BE UP TO 32 ALPHANUMERIC CHARACTERS LONG. IT CANNOT BE EMPTY AND IT CANNOT START WITH A NUMBER. IT CANNOT CONTAIN CHARACTERS OTHER THAN ALPHABETS AND NUMBERS AND SPACES. IT CANNOT ESPECIALLY CONTAIN A ",", -SPECIAL ERROR FOR THIS CHARACTER VERSUS OTHERS. THE EXCEPTIONS FOR THE SYNTAX RULE ARE SPECIAL NAMES LIKE "FR_link" WHICH IS CONSIDERED VALID.<br>1. UNIQUENESS RULES:<br>MUST BE UNIQUE IN SYSTEM: ACROSS USER NAME, ANOTHER USER'S NAME OR FULL NAME, ANY HUNT GROUP NAME, AND OTHER SIMILAR FIELDS THROUGHOUT SYSTEM. |
| EXTENSION | 1. SYNTAX RULE<br>MUST BE SYNTACTICALLY CORRECT: HERE SYNTAX RULE IS THAT THE FIELD CAN BE BETWEEN 2 TO 9 DIGITS LONG WITH NUMERIC CHARACTERS ONLY. IT CANNOT BE EMPTY IN GENERAL. THE EXCEPTIONS FOR THE SYNTAX RULE OF NOT BEING EMPTY ARE SPECIAL USERS WHO HAVE SPECIFIC PROPERTIES OR HAVE BEEN CREATED FOR REMOTE ACCESS OR DIAGNOSTICS PURPOSES.<br>1. UNIQUENESS RULES:<br>MUST BE UNIQUE IN SYSTEM: ACROSS ANOTHER USER'S EXTENSION, HUNT GROUP EXTENSION, SHORT CODE'S CODE OR OTHER SIMILAR FIELDS THROUGHOUT SYSTEM. MUST ALSO NOT BEGIN WITH THE EMERGENCY NUMBER (e.g. 911) OR THE DIAL OUT CODE (9). MUST ALSO NOT MATCH A RANGE OF PATTERNS FOR SHORT CODES THAT ARE CONSIDERED EQUIVALENT TO A PLAIN NUMBER FOR DIALING PURPOSES. |
| BUTTONS | EACH BUTTON IS VALIDATED FOR RULES AS APPROPRIATE FOR THAT BUTTON ACTION TYPE. e.g. RESTRICTION OVERRIDE BUTTONS ARE VALIDATED TO ENSURE THAT THEY ARE OF THE SAME PATTERN AND SAME PARAMETRIC VALUES AS THAT OF SYSTEM WIDE RESTRICTION SHORT CODES EXCEPT FOR FUNCTIONAL DIFFERENCES THAT ARE ALLOWED. |

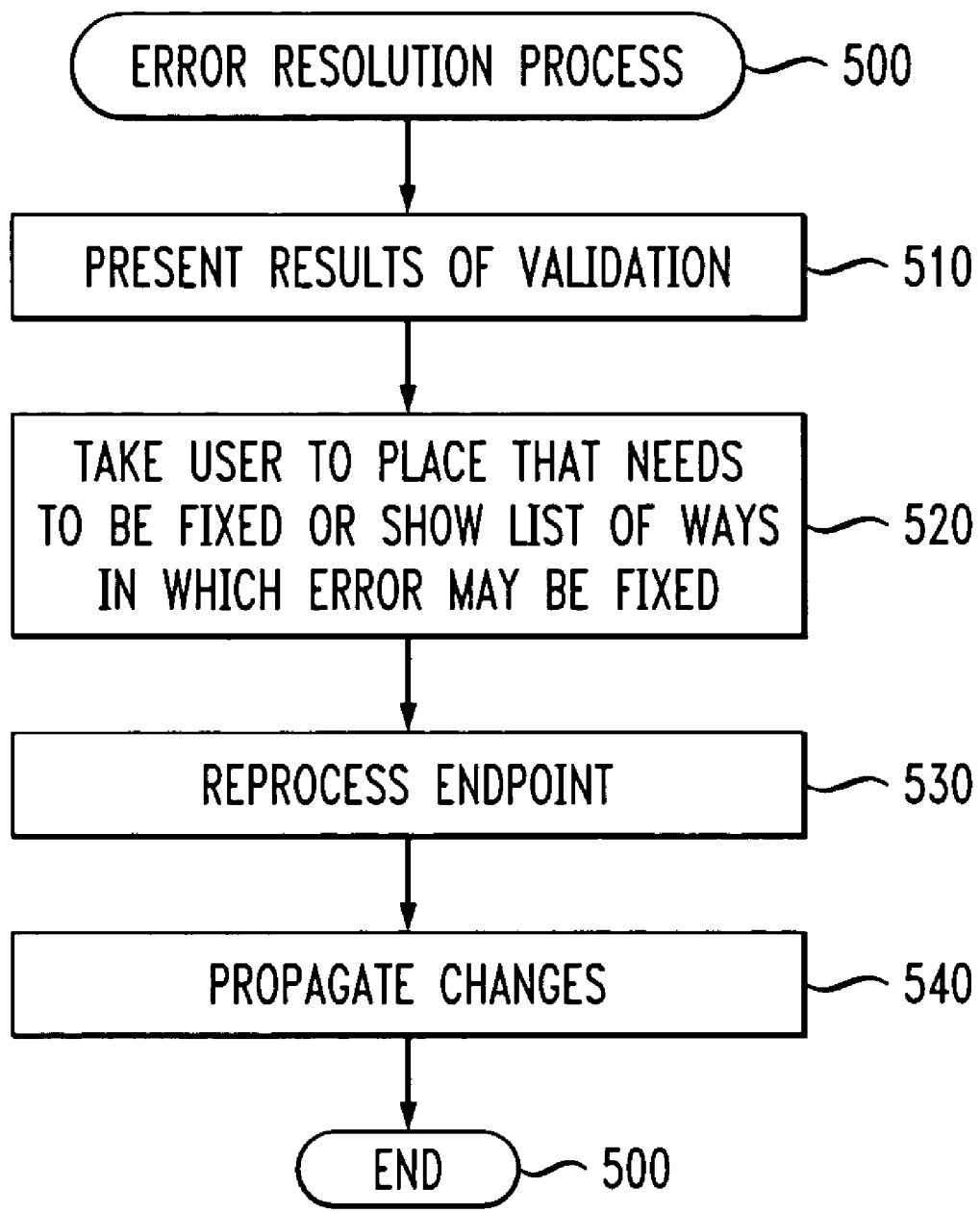

FIG. 18A
VALID DAUGHTER CARDS FOR US CONTROL UNITS

| CONTROL UNIT | SLOT A | SLOT B | SLOT A CHANGE IN RELEASE 2.1 |
|---|---|---|---|
| IP 403 | NONE<br>ANALOG CARD | NONE<br>ANALOG CARD<br>T1/PRI CARD | NONE<br>ANALOG CARD<br>T1/PRI CARD |
| IP 406 | NONE<br>ANALOG CARD<br>T1/PRI CARD | NONE<br>ANALOG CARD<br>T1/PRI CARD | NO CHANGE |
| IP 412 | NONE<br>ANALOG CARD<br>T1/PRI CARD<br>DUAL T1/PRI CARD | NONE<br>ANALOG CARD<br>T1/PRI CARD<br>DUAL T1/PRI CARD | NO CHANGE |

FIG. 18B
VALID DAUGHTER CARDS FOR ROW CONTROL UNITS

| CONTROL UNIT | SLOT A | SLOT B | SLOT A CHANGE IN RELEASE 2.1 |
|---|---|---|---|
| IP 403 | NONE<br>ANALOG CARD | NONE<br>ANALOG CARD<br>QUAD BRI CARD<br>E1 CARD<br>PRI CARD | NONE<br>ANALOG CARD<br>QUAD BRI CARD<br>E1 CARD<br>PRI CARD |
| IP 406 | NONE<br>ANALOG CARD<br>E1 CARD<br>PRI CARD<br>QUAD BRI CARD | NONE<br>ANALOG CARD<br>E1 CARD<br>PRI CARD<br>QUAD BRI CARD | NO CHANGE |
| IP 412 | NONE<br>ANALOG CARD<br>E1 CARD<br>PRI CARD<br>QUAD BRI CARD<br>DUAL E1 CARD<br>DUAL PRI CARD | NONE<br>ANALOG CARD<br>E1 CARD<br>PRI CARD<br>QUAD BRI CARD<br>DUAL E1 CARD<br>DUAL PRI CARD | NO CHANGE |

METHOD AND APPARATUS FOR VALIDATION AND ERROR RESOLUTION OF CONFIGURATION DATA IN A PRIVATE BRANCH EXCHANGE SWITCH

CROSS-REFERENCE TO RELATED APPLICATIONS

The present application is related to United States patent application, entitled "Method and Apparatus for Administering Configuration Information in a Private Branch Exchange Switch," filed contemporaneously herewith and incorporated by reference herein.

FIELD OF THE INVENTION

The present invention relates generally to techniques for administering enterprise switches, and more particularly, to methods and apparatus for administering voice telephony systems that provide an IP telephony switching function.

BACKGROUND OF THE INVENTION

With the explosive growth of the Internet, there has been a growing trend towards Internet Protocol (IP) telephony. IP telephony allows various devices, often referred to as endpoints, such as dedicated IP phones or specially configured personal computers, to initiate and receive telephone calls over the Internet or private data networks. Generally, the voice signal is compressed and translated into IP packets for transmission over the network(s).

IP telephony offers many benefits to both carriers and users that have contributed to its rapid deployment. Eventually, IP telephony technologies may replace traditional circuit switched telephony technologies, such as the Public Switch Telephone Network (PSTN). In the meantime, however, there is a substantial installed base of traditional telephone systems served by the PSTN and IP telephony must co-exist with traditional telephone systems.

A number of products are available that allow enterprises to integrate their traditional telephone systems, such as private branch exchange (PBX) switches with IP telephony features. The IP Office™ product, commercially available from Avaya, Inc., of Basking Ridge, N.J., supports voice and data communications. IP Office™ can be set up as a traditional PBX, an IP telephony server, or a combination of both. Thus, the IP Office™ product allows an enterprise to immediately implement traditional telephony, and evolve to IP over time, or to immediately implement a full IP solution.

While these emerging IP telephony products effectively allow enterprises to transition to IP telephony communications, some of the products have been difficult to administer. A number of early administration tools for such switches required specific user training and provided little, if any, assistance with the entry of configuration information. In addition, once the configuration information was entered, such administration tools allowed the configuration information to be changed without ensuring the accuracy of such changes or without providing a mechanism to resolve any errors created by the changes.

A need therefore exists for an administration tool for an enterprise telephone switch that provides improved installation and administration, with increased efficiency and reliability. A further need exists for an administration tool that can validate configuration data for the enterprise telephone switch and efficiently guide a user or administrator through error resolution.

SUMMARY OF THE INVENTION

Generally, methods and apparatus are provided for validating configuration data in a switch, such as a private branch exchange switch that optionally provides an IP Telephony feature. An error is detected if the configuration data fails to comply with one or more rules; and a user is presented with an interface that allows the user to correct the error. The rules may include one or more syntactic rules and one or more conflict rules. In the case of a simple error, the user is presented with an error indication with a smart error link. In the case of a conflict error, the user is presented with an error indication that identifies the conflicting endpoints and optionally allows the user to correct at least one conflicting endpoint.

Another aspect of the invention revalidates the configuration data after a change is made by a user. In addition, changes are propagated to affected data objects (e.g., those objects referenced by a changed object). There are a number of error types that may be automatically updated, without direct user involvement.

The configuration data may include an object that inherited a property through application of a template to the data object. A list is maintained of the data objects associated with each template, so that the associated data objects can be updated if the template is updated. The errors (and optionally, information about each error) can be presented to the user in a hierarchical error tree. The user can select errors from the tree to be corrected. The error tree can optionally be redisplayed following a change by validating only affected elements.

A more complete understanding of the present invention, as well as further features and advantages of the present invention, will be obtained by reference to the following detailed description and drawings.

BRIEF DESCRIPTION OF THE DRAWINGS

FIG. 4 is a sample table describing an exemplary validation rulebase that contains one or more syntax or conflict rules;

FIG. 5 is a flow chart describing an exemplary implementation of an error resolution process;

FIGS. 18A and 18B are sample tables storing exemplary hardware (valid daughter cards) for control units in a primary country and the rest of world (ROW), respectively.

DETAILED DESCRIPTION

Figure 1:
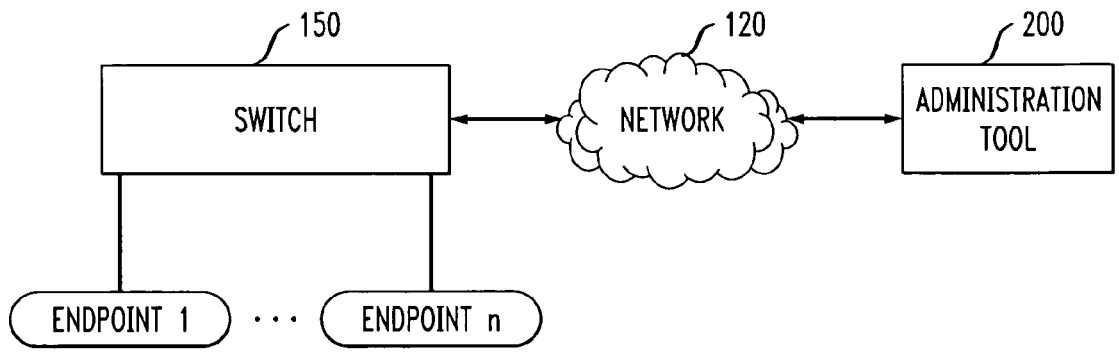
FIG. 1 illustrates a network environment in which the present invention can operate.

The present invention provides an administration tool 200 for administering a switch 150, such as a Private Branch Exchange (PBX) switch that optionally provides an IP Telephony feature. According to one aspect of the invention, the administration tool 200 provides improved validation and error resolution functions. FIG. 1 illustrates an exemplary network environment in which the present invention can operate. As shown in FIG. 1, a user (administrator) employing an administration tool 200, discussed below in conjunction with FIG. 2, configures a switch 150 over a network 120. The network 120 may be embodied as any private or public wired or wireless network, including the Public Switched Telephone Network, a Private Branch Exchange switch, Internet, or cellular network, or some combination of the foregoing. While the present invention is illustrated using a server side implementation, where the features of the present invention are resident on the administration tool 200, the features and functions of the present invention may be deployed on a number of distributed tools 200, as well as on a client associated with the switch 150, or a combination of the foregoing, as would be apparent to a person of ordinary skill in the art.

The switch 150 may be embodied, for example, as the IP Office™ switch. The switch 150 can be set up, for example, as a traditional PBX, an IP telephony server, or a combination of both. The switch 150 connects one or more endpoints 1 through endpoint n. It is noted that the endpoints can be directly connected to the switch 150, as shown in FIG. 1, or can be connected to the switch 150 over the network 120. Similarly, the administration tool 200 can be directly connected to the switch 150, or can be connected to the switch 150 over the network 120 as shown in FIG. 1. As discussed hereinafter, the administration tool 200 can process the configuration data 1600, as discussed further below in conjunction with FIG. 16, for the switch 150 in an online or offline manner. In other words, the administration tool 200 can process the configuration data 1600 whether or not the switch 150 is present.

Figure 2:
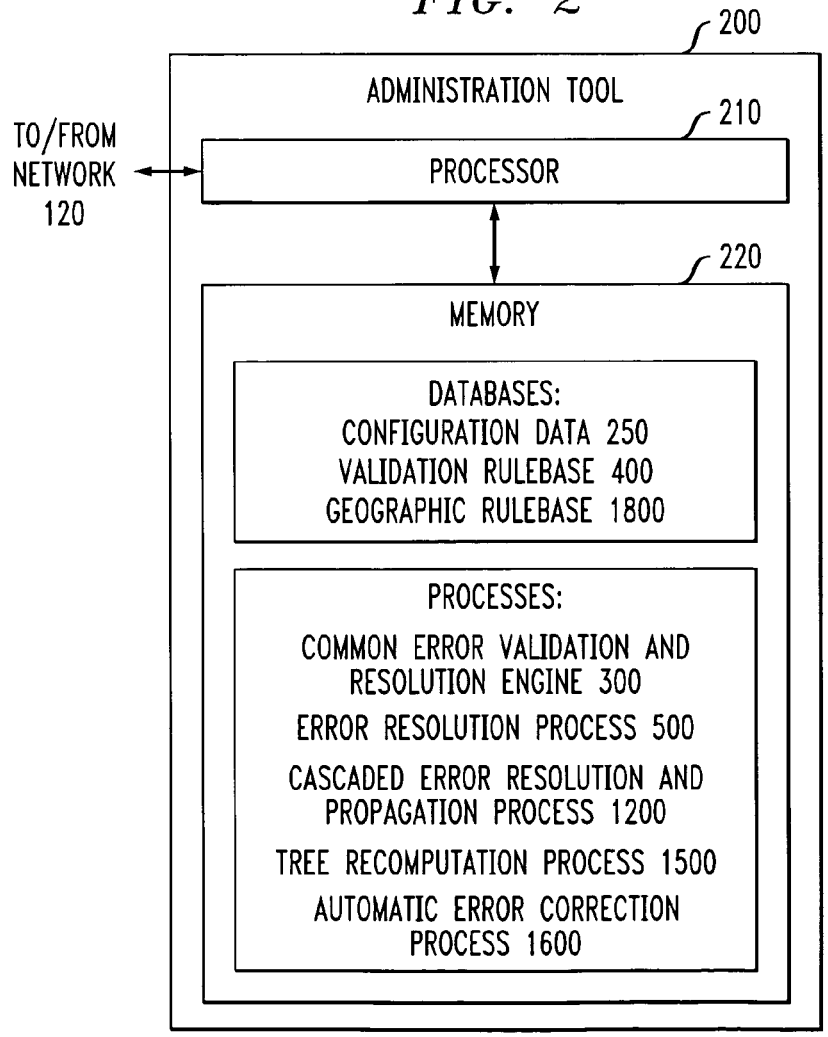
FIG. 2 is a schematic block diagram of an exemplary administration tool incorporating features of the present invention.

FIG. 2 is a schematic block diagram of an exemplary administration tool 200 incorporating features of the present invention. The administration tool 200 may be any computing device, such as a personal computer, work station or server. As shown in FIG. 2, the exemplary administration tool 200 includes a processor 210 and a memory 220, in addition to other conventional elements (not shown). The processor 210 operates in conjunction with the memory 220 to execute one or more software programs. Such programs may be stored in memory 220 or another storage device accessible to the administration tool 200 and executed by the processor 210 in a conventional manner.

For example, the memory 220 may store configuration data 250, a validation rulebase 400 and a geographic rulebase 1800, as discussed further below in conjunction with FIGS. 4 and 18. In addition, the memory 220 may store a common error validation and resolution engine 300; an error resolution process 500; a cascaded error resolution and propagation process 1200; an error tree recomputation process 1500, and an automatic error correction process 1600, as discussed further below in conjunction with FIGS. 3, 5, 12, 15 and 16, respectively.

Error Validation and Resolution

The administration tool 200 validates the configuration data 250 that applies to the switch 150. For a detailed discussion of suitable techniques for the importation and processing of the configuration data 250, see, United States patent application, entitled "Method and Apparatus for Administering Configuration Information in an Enterprise Switch," incorporated by reference herein. Once the configuration data 250 has been validated, changes are propagated, errors are removed and the affected elements are revalidated to reconstitute an error tree.

As discussed hereinafter, the validation and error resolution aspects of the present invention include a number of aspects, including: (i) Common Error Validation and Resolution Framework, (ii) Cascaded Error Resolution and Propagation, (iii) Faster Recomputation of elements in Error Tree after resolving any error, (iv) Automatic Error Fixing, and (v) Geographic Rules and Validation for Single Global Application. Each of these aspects are addressed, in turn, in the following sections.

Generally, as discussed below in a section entitled "Common Error Validation and Resolution Framework," the administration tool 200 provides a common validation and error resolution engine that is applied in all contexts. The common validation and error resolution engine generates results and facilitates the correction of errors. As discussed below in a section entitled "Cascaded Error Resolution and Propagation," describes how an error is resolved following a validation, and how the configuration data 250 is revalidated in an iterative fashion.

As discussed below in a section entitled "Faster Recomputation of Changed Elements in Error Tree," accumulated errors are presented to the administrator as an error tree, and as presented errors are resolved, the error tree is redisplayed by validating only affected elements and not the entire configuration dataset 250. In a section entitled "Automatic Error Fixing," techniques are presented for the automatic correction of certain error types. Finally, in a section entitled "Geographic Rules and Validation for Single Global Application," a framework is provided that allows the administration tool 200 to facilitate the generation or modification of the configuration data 250 by limiting choices, such as hardware choices, to those choices that are appropriate for a given geographic location. For example, while importing a configuration, if the hardware does not match, an error is presented indicating that the hardware is incorrect for the locale.

Common Error Validation and Resolution Framework

The validation and error resolution capability of the administration tool 200 employs a common error validation and resolution engine 300, discussed below in conjunction with FIG. 3, that is used in all contexts to validate and correct system endpoints within the switch 150. The validation engine provides a common framework for the different endpoints to get recursively validated in the system 150 in a similar fashion. The error resolution engine is also a single engine that is capable of providing unique solutions for every error.

For instance, in an exemplary implementation of the administration tool 200, there might be about 150 types of simple errors that may be fixed in a single way per each error (or up to a maximum of two ways for some simple errors). The exemplary administration tool 200 also has about 50 types of conflict errors between different kinds of endpoints in the system, with each error having a custom set of choices to solve the error. This results in about 180 unique ways of fixing conflict errors. Yet, the common engine 300 can handle all such errors. This common engine 300 can also handle any new endpoints that may be added to the system 150. The resolution engine 300 can also accommodate custom ways to fix the new errors (simple or conflict with other endpoints in the system) for the new endpoint.

The common validation and resolution engine 300 is used while reading in the configuration data 250 or applying imports or making changes to the switch 150 using the administration tool 200. The validation engine is used to validate a system and all its endpoints and fields for correct syntax, for being unique in the system if appropriate and for abiding with system wide pattern rules and restrictions. The framework also proceeds to allow an administrator to fix an error until the error is resolved by giving the administrator an opportunity to modify the system endpoint or a dependant system endpoint. The resolution framework allows the administrator to fix an error using a common engine that generates a custom set of ways to resolve a specific error. The administrator may then choose one of the suggested actions from the given set of choices. The common engine will interpret the choice and ask the administrator for context specific required data and use the changes made there to revalidate. The created or modified objects are then subject to a revalidation. When the system endpoint has been changed satisfactorily, such that the error has been fixed by either changing the endpoint or changing any other conflicting endpoints in the switch, the changes are propagated throughout the system to synchronize the new settings for the endpoint as well as dependant endpoints.

Thus, the common error validation and resolution engine 300 allows the same engine to be used during many actions, such as validating a configuration, performing imports, changing specific elements and validating only a subset of the configuration. Error messages are presented as smart error messages that assist the administrator with fixing the error. The common error validation and resolution engine 300 is a single engine that caters to solving different kinds or errors. The error fixing can be as simple as showing the reason or as complex as allowing the administrator to select from a selection of ways that the error can be resolved, and depending on the selection, allowing the administrator to make the change right there. Although the error resolution behaves as though it is unique for each custom error, the engine is a single entity and is automated to generate the display mechanism of the error, the multiple ways of resolving any error and interpreting selection of resolving error and revalidation and propagation of change to dependant endpoints in the system.

Figure 3:
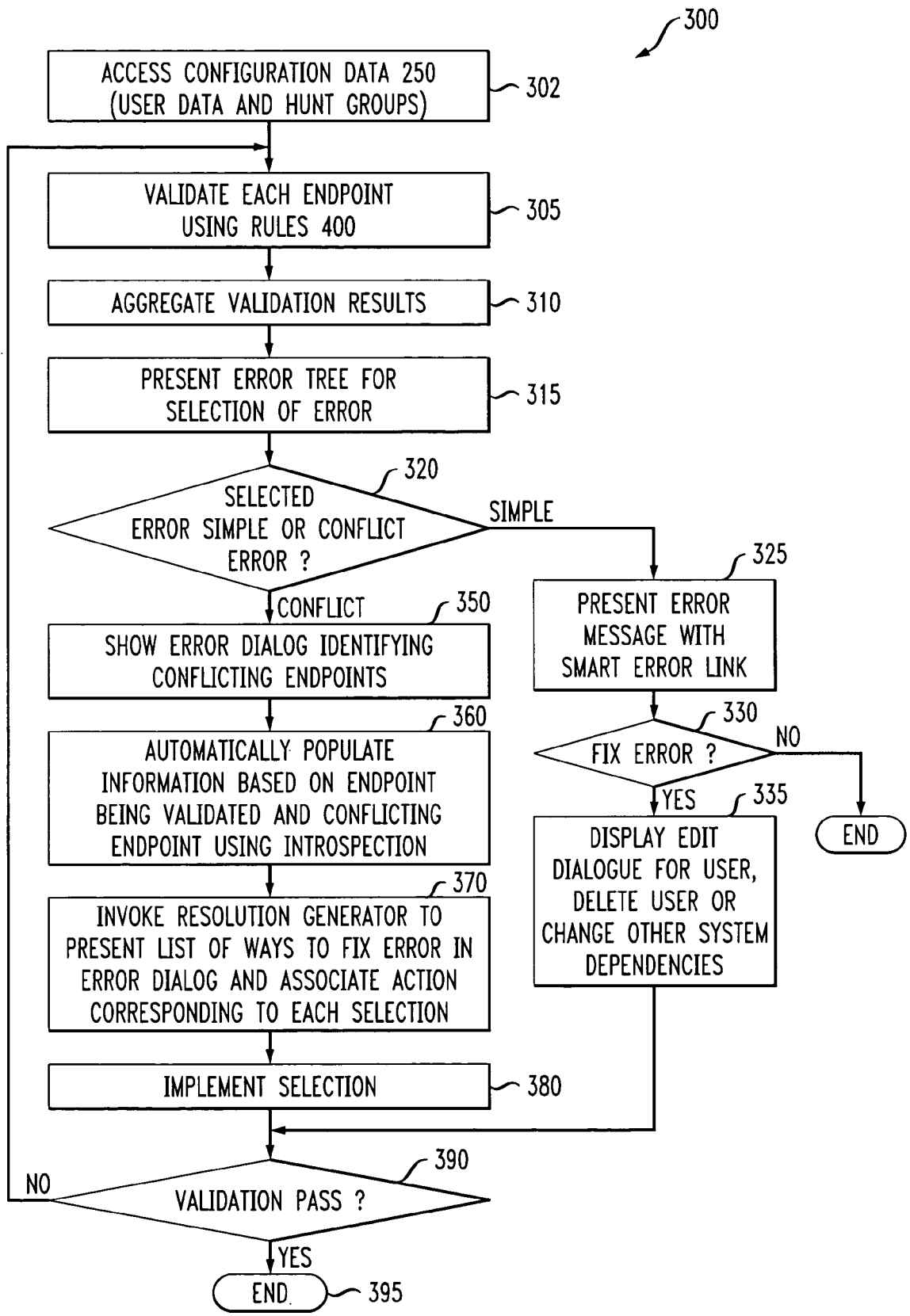
FIG. 3 is a flow chart describing an exemplary implementation of the common error validation and resolution engine

FIG. 3 is a flow chart describing an exemplary implementation of the common error validation and resolution engine 300. As shown in FIG. 3, the common error validation and resolution engine 300 initially accesses the configuration data 250 to be validated during step 302. The configuration data 250 contains user data and hunt groups. Thereafter, each endpoint is validated in turn during step 305. For example, to validate a user (endpoint), the extension, full name and name are validated and the result is collected. It is noted that the extension, full name and name are the internal members of the user data class.

The validation results for all endpoints are aggregated during step 310. An error tree is presented to the administrator during step 315 for selection of an error to be resolved. Generally, as discussed below in conjunction with FIG. 9, the error tree 900 can be organized according to errors for each endpoint, such as user or hunt group.

A test is performed during step 320 to determine if the administrator selected a simple or a conflict error (depending on error type). If it is determined during step 320 that the selected error is a simple error, then program control proceeds to step 325 where an error message is presented to the administrator with a smart error link. If the administrator indicates during step 330 that he or she wishes to fix the error, the common error validation and resolution engine 300 can, for example, display an edit dialogue interface for user, delete user or change other system dependencies during step 335.

If it is determined during step 320 that the selected error is a conflict error, then program control proceeds to step 350 where an error dialog is presented indicating the conflicting endpoints. The presented dialog window is automatically populated during step 360 based on the endpoint being validated and the conflicting endpoint using introspection techniques. A resolution generator generates a list of ways to fix this error during step 370 and these selections are populated in the error dialog. An action is associated with each selection. Assuming a user conflicts with a hunt group, for example, these selections may be to delete or modify the original user, or to delete or modify the conflicting hunt group. After the administrator makes a choice, the selection is implemented during step 380. For example, if the administrator chooses to modify the hunt group, a dialog is presented to modify the hunt group.

The configuration data 250 is validated during step 390. If the validation fails, program control returns to step 305 and continues in the manner described above. If the validation passes, program control terminates during step 395. At each level of validation, new changes are processed and revalidated in an iterative fashion (Level II of Validation) and the results are stored. Continuing the above example, if validation of the modified hunt group succeeds, the modified hunt group and user are stored in overall system configuration data 250. The changes are propagated for each changed field to dependant data structure in the system 150.

During step 305, an endpoint or the entire system is validated. When the entire system configuration is validated, it validates each of its members, e.g. lists of users and hunt groups. When a list of users needs to be validated, each user in the list is validated. When each user is validated it in turn validates all its member data. The validation engine is therefore iterative on any entity by invoking its member's validation before it is done. The results of the validation need to be stored and collected iteratively.

When an endpoint gets validated, instead of passing around a data structure to collect the results of validation as it iteratively calls its child members' validation, the result is aggregated after each child is validated. Each child knows who its parent is and hence does not lose focus of its position in a hierarchy even though it looks independent. Both the result for a single endpoint as well as an aggregated result for a complex endpoint containing many endpoints in turn, have similar interfaces.

These steps allow a common validation engine to be used irrespective of what level validation is invoked, i.e., at the system level or at the user level, whether it is a collection of users or any other mix of endpoints.

FIG. 4 is a sample table describing an exemplary validation rulebase 400 that contains one or more syntax or conflict rules (or both). The exemplary validation rulebase 400 contains a set of rules to validate the user fields. For each identified user field, the validation rulebase 400 indicates one or more exemplary corresponding rules or constraints. Generally, each rule or constraint is classified as a syntax or conflict rule. For example, a user name, full name and extension must be syntactically correct and unique across the system.

The syntax rules validate any field for correct syntax as appropriate for that field. The Syntax rules are for length, valid characters and if field can be empty and if so what are the dependant rules. The conflict rules validate certain fields to ensure that they are unique across the system 150. Examples of these fields are extensions and other dial-able endpoints. Other fields that also need to be unique are names of system endpoints that are used as login identifiers in another context and therefore have to be unique. Whether a field is unique is based on the following criteria and the reason for error should be identified for each nuance:

a. exact field value must not be repeated (i.e., there should be no duplicates within own endpoint type);
b. exact field value must not be found across different endpoint types;
c. pattern matching algorithms are applied where certain patterns are considered to also be a duplicate;
d. exact match against critical system endpoints (e.g., the emergency number); and
e. exact match against global system endpoints such as the dial out code, which is used to dial outside the switch, to call outside telephone numbers.

The following exemplary validation mechanisms can be implemented: (i) semantic validation; (ii) value validation with respect to entire system (e.g., uniqueness); (iii) perform IP address validation; (iv) apply IP address class and subnet rules; and (v) execute ping to verify devices on network.

FIG. 5 is a flow chart describing an exemplary implementation of an error resolution process 500. As shown in FIG. 5, the error resolution process 500 initially presents the validation results to the administrator during step 510. Generally, after a system or an endpoint is validated, an aggregated result is returned that has a tree like progression of all the errors for each endpoint that it contains. According to one aspect of the invention, the presentation of the results ("what is wrong and why") is different depending on the context of the validation. For example, if the entire system is validated or for a validation following an import, an error tree 900 (FIG. 9) is shown. The error tree 900 contains all the endpoints that have failed because of errors. Further, for each endpoint, the error tree view displays all the errors that are applicable to this endpoint. In other cases, where an administrator needs to resolve one error at a time, one error is chosen and displayed.

During step 520, the administrator is taken to the place that needs to be fixed or is shown a list of the ways in which the error may be fixed (and waits for the administrator to make a choice from the list). Once the selection has been made, the error resolution process 500 implements the action behind the selection, e.g., to delete the item that is being validated, to edit the item that is being validated, to change one or many system endpoints, or to delete conflicting system endpoints.

The endpoint is reprocessed during step 530. After changes are made in step 520, the endpoint is revalidated to see if the endpoint is now correct. If correct, changes are propagated to dependant fields during step 540. After all these objects are changed, the changes are propagated to all the other objects in the system where these changed objects are referenced. For example, when a user name or extension changes, all the incoming call routes, which are directed to this user, all user buttons, forwarding and follow me numbers that referred to the old extension, covering extensions, hunt groups, E911 zones, direct call pickup user buttons, and source numbers for all users will be updated, if needed, to reflect the changes in the extension number, and/or name.

Class Diagrams

Figure 6:
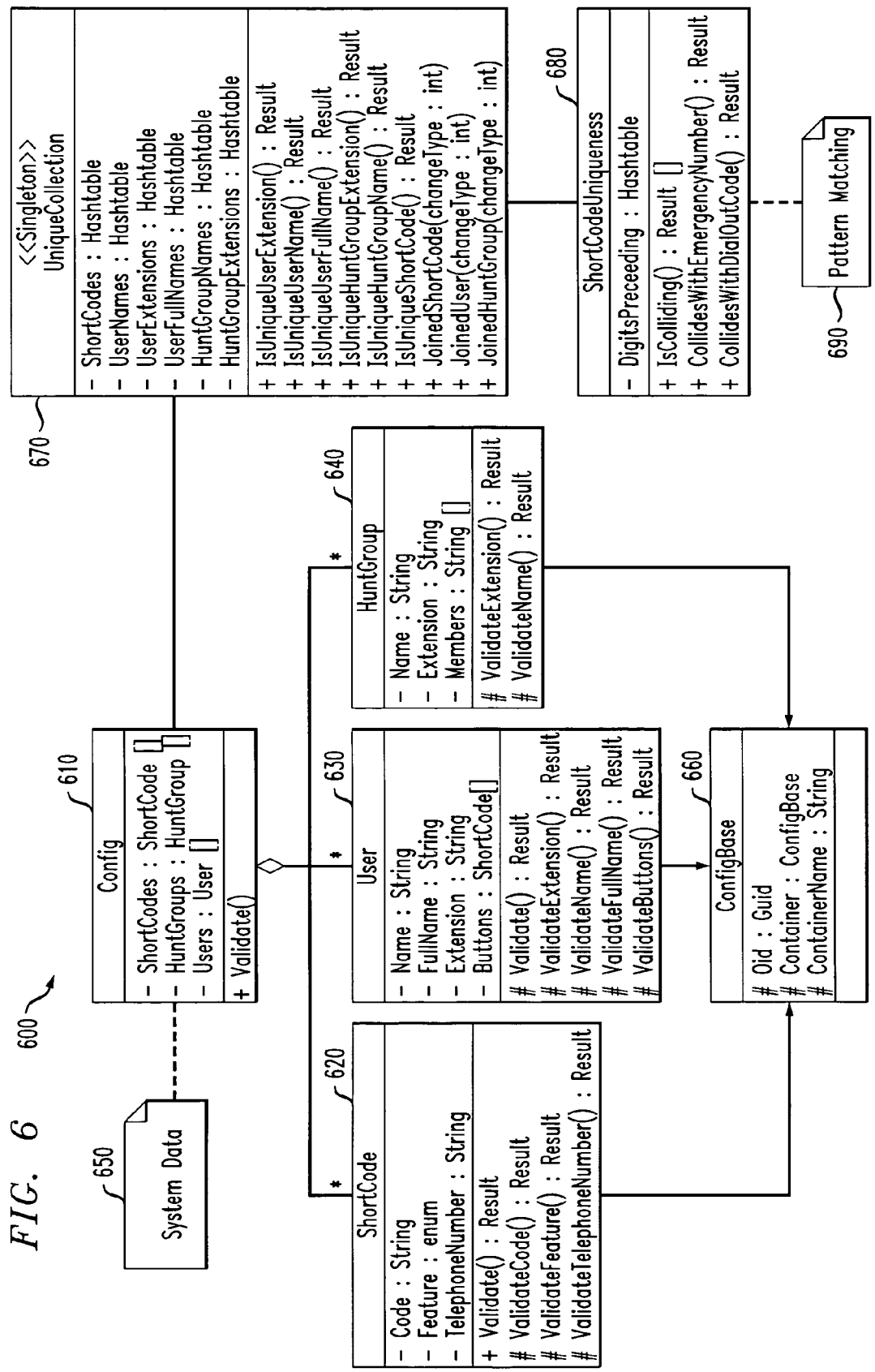
FIG. 6 illustrates the relationship between various classes of configuration data.

FIG. 6 illustrates the relationship between the various data 600 discussed herein, in accordance with exemplary Unified Modeling Language (UML) conventions. As shown in FIG. 6, a configuration object is of type Configuration Class 610 and is an aggregation of one or more short code objects 620, user objects 630 and hunt group objects 640. The note 650 associated with the configuration class 610 indicates that a configuration object along with (recursively) all it's contained objects 610 contain the system data. Each short code object 620 is comprised of a string indicating the code, an indication of the feature associated with the short code and any additional information. Each user object 630 is comprised of a user name, full name, extension number and any short codes defined for buttons on the user's device. Each hunt group object 640 is comprised of a name and extension number associated with the hunt group, as well as a member list.

In addition, each class, such as the classes 610, 620, 630 and 640, include one or more functions applicable to the object in the third class section. For example, the configuration class 610 includes a validate function that, when called, invokes the validate functions in each of the contained objects. When the validate function in a contained object is called, such as the validate function for the short code class 620, the additional validation functions within the contained object's class (validate code, validate feature and validate telephone number) are also invoked in an iterative fashion.

As shown in FIG. 6, the system data 600 includes a singleton class 670, referred to as "unique collection." The singleton class 670 provides a set of hash tables to access, for example, short codes and user names, so that such classes can be more efficiently accessed. The unique collection class 670 provides a number of validation methods in the third section to ensure that they do not have data that creates a conflict. In addition, the unique collection class 670 provides a number of joined methods that report changes to the data. The short code uniqueness class 680 performs a pattern matching function (as indicated by note 690), to determine if a short code is unique and to also determine if user or hunt group extensions conflict with short codes based on a set of patterns.

Figure 7:
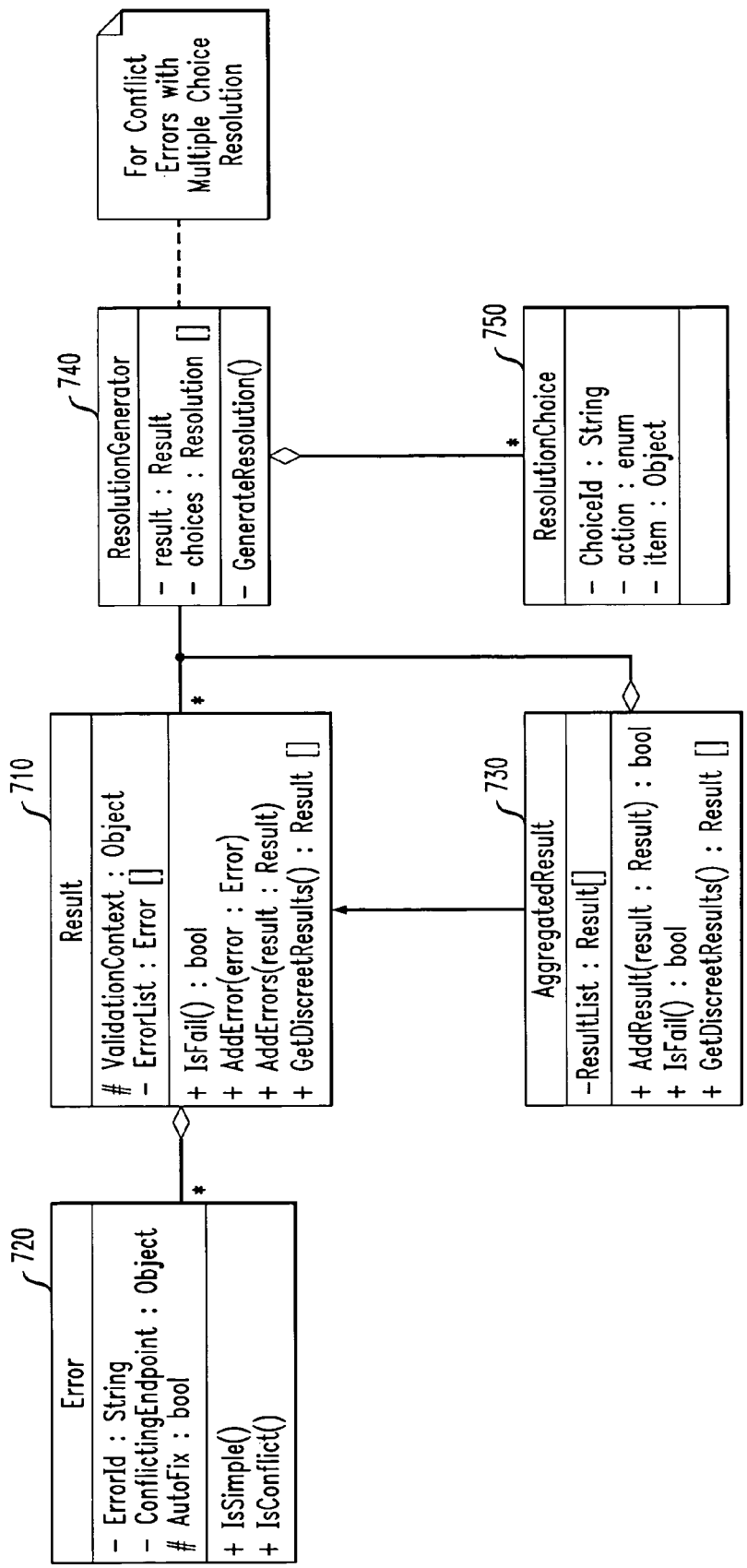
FIG. 7 illustrates the relationship between various validation result data classes.

FIG. 7 illustrates the relationship between the various validation result data classes discussed herein, in accordance with exemplary UML conventions. As shown in FIG. 7, a result object 710 identifies one or more objects being validated, and a corresponding list of errors. The result class 710 includes a number of methods in the third section for error processing. For each error type, there is a corresponding error class object 720 that identifies the error, allows any conflicting object(s) to be identified, and contains a Boolean flag indicating whether or not the error may be automatically fixed, as discussed herein.

An aggregated result class object 730 contains a collection of the validation results for a given configuration as it contains the different endpoints. In this manner, the error tree 900 can be constructed with the class/object hierarchy. A resolution generator class 740 contains a method that facilitates the correction of errors. The resolution generator class 740 generates the error resolution message during step 370 (FIG. 3) with a list of ways to fix an error and associated actions corresponding to each selection.

Figure 8:
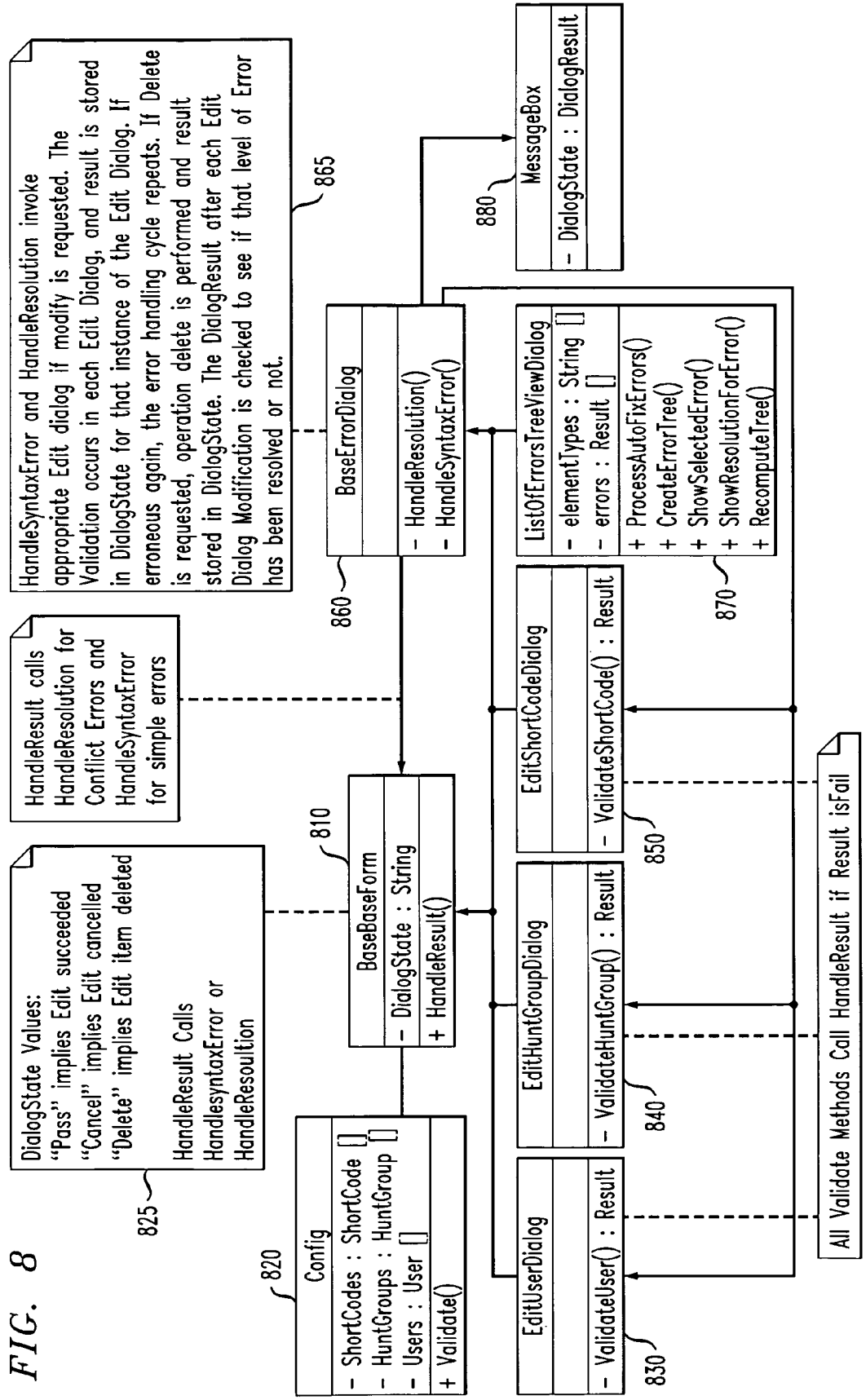
FIG. 8 illustrates the relationship between various error resolution data classes.

FIG. 8 illustrates the relationship between the various error resolution data classes discussed herein, in accordance with exemplary UML conventions. As shown in FIG. 8, a Base-BaseForm class object 710 receives a result from an object validation process. The BaseBaseForm class 710 includes a method to handle results. As indicated in note 825, the handle results method calls a handle syntax error method (for simple errors) or a handle resolution method (for complex errors), that are part of the base error dialog class 860. The handle syntax error method or a handle resolution method invoke appropriate edit dialog boxes if the administrator elects to modify an error (see note 865). The validation occurs in each edit dialog after the administrator makes changes, and the result is stored in the dialog state field of that edit dialog. The handle syntax error method or a handle resolution method invoke the appropriate methods in the edit user dialog object 830, edit hunt group dialog object 840 or edit short code dialog object 850 to display themselves, accept changes, revalidate and store the results of validation. The list of error tree view dialog class 870 is invoked to generate the error tree 900 when there is more than one error.

Error Resolution

For a simple error, the administrator can be presented a message with information on the nature of the error, so that the administrator can correct the error.

Figure 9:
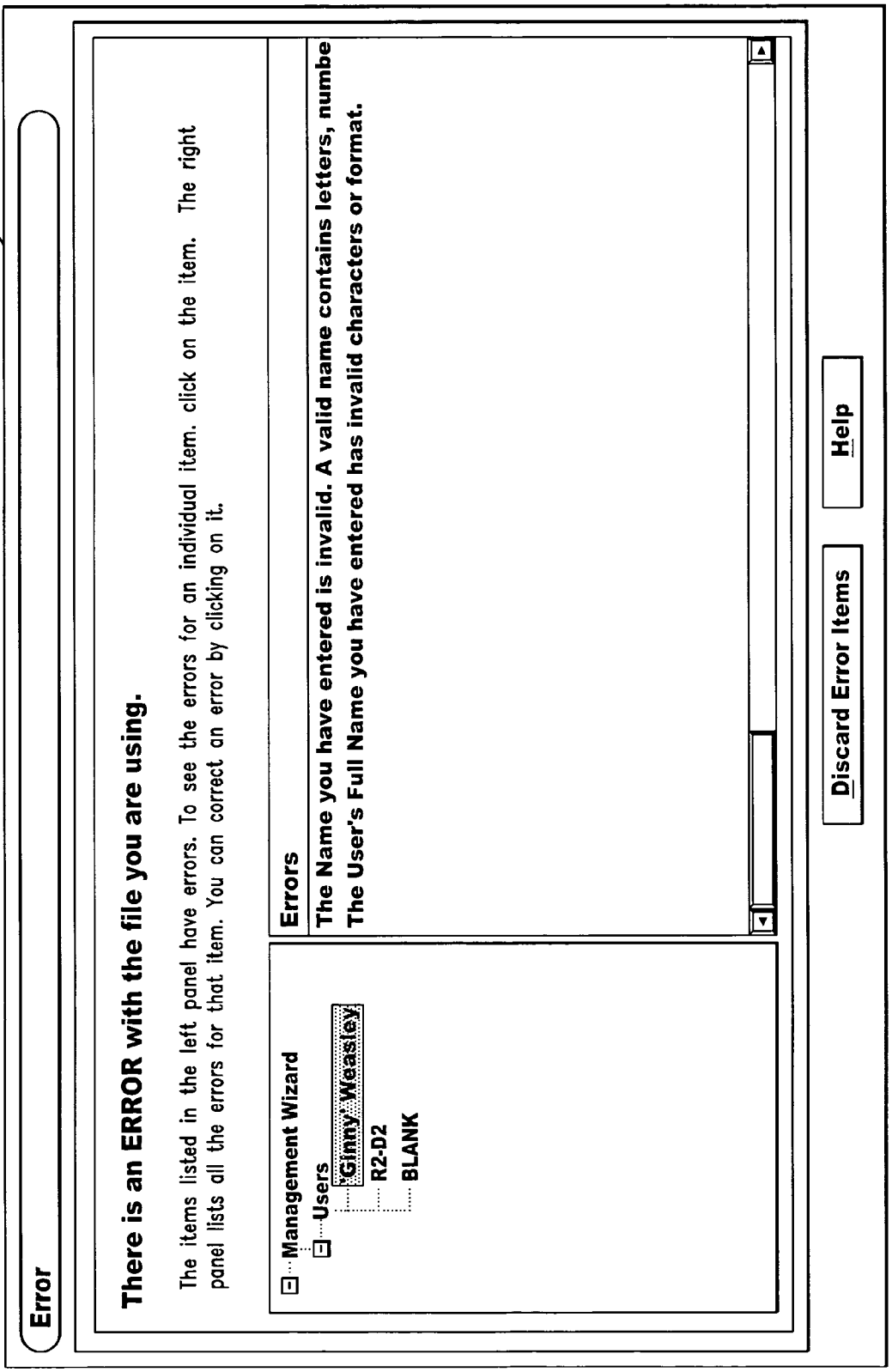
FIG. 9 illustrates an exemplary error tree interface that has been populated with one or more conflict errors.

For a conflict error, the administrator can be presented with an error tree 900, shown in FIG. 9. FIG. 9 illustrates an exemplary error tree interface 900 that has been populated with one or more conflict errors. As shown in FIG. 9, the exemplary error tree interface 900 includes a first section 910 identifying one or more errors that were detected by the common error validation and resolution engine 300 and a second section 920 providing additional details on an error selected in the first section 910. For example, the error tree 900 indicates a conflict between a user and an existing short code.

Figure 10:
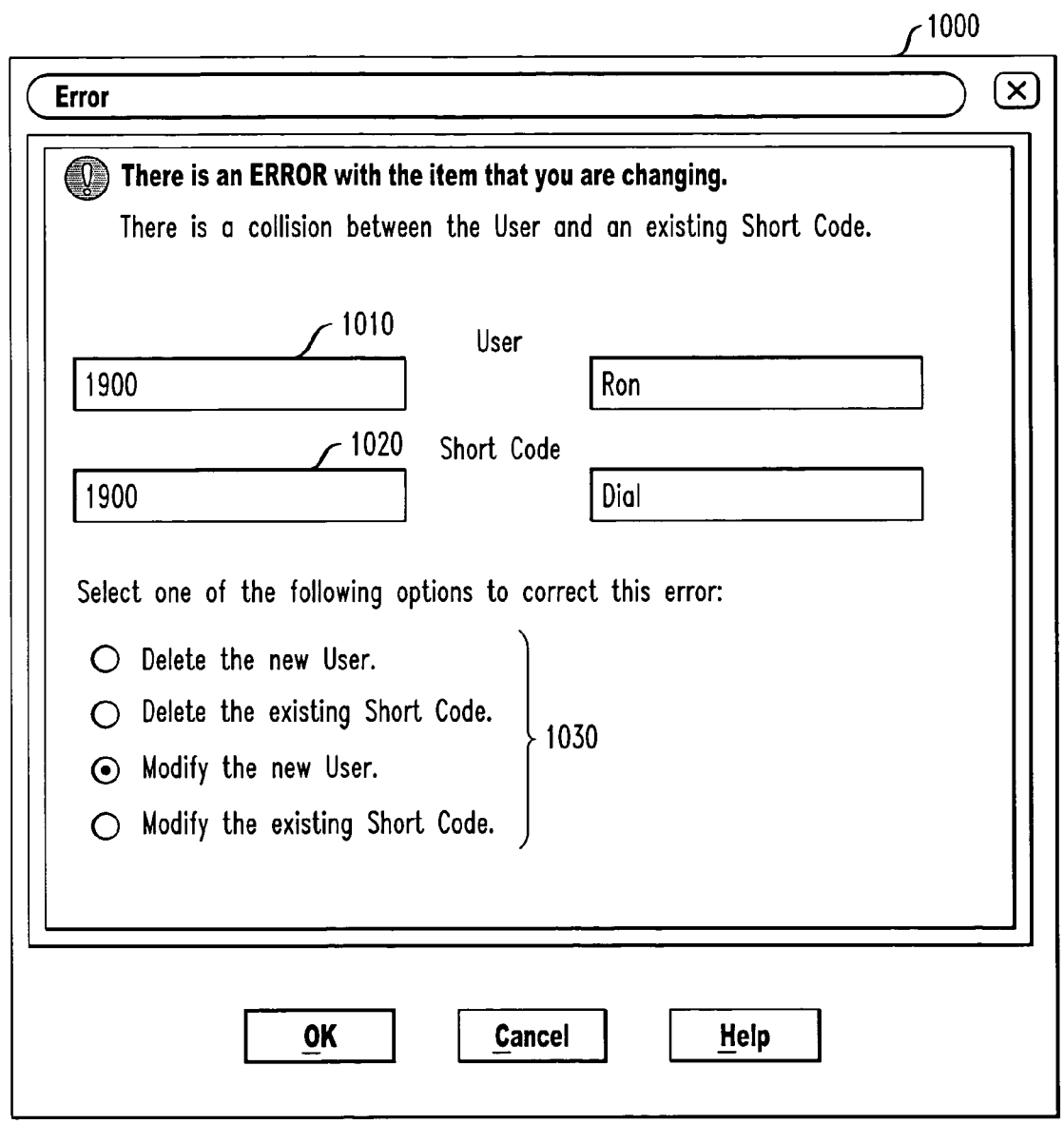
FIG. 10 illustrates an exemplary conflict error dialog message that has been populated with an illustrative conflict error.

If the administrator elects to fix the conflict error shown in FIG. 9, an exemplary conflict error dialog message 1000, shown in FIG. 10, may be presented. FIG. 10 illustrates an exemplary conflict error dialog message 1000 that has been populated with an illustrative conflict error. As shown in FIG. 10, the conflict error dialog message 1000 identifies the two endpoints 1010, 1020 that are conflicting, and provides the administrator with a set of options 1030 for correcting the error. In the illustrative embodiment, the administrator has selected to modify the error on the user endpoint, and an appropriate edit user parameter dialog box 1100, shown in FIG. 11A, can be presented.

Figure 11A:
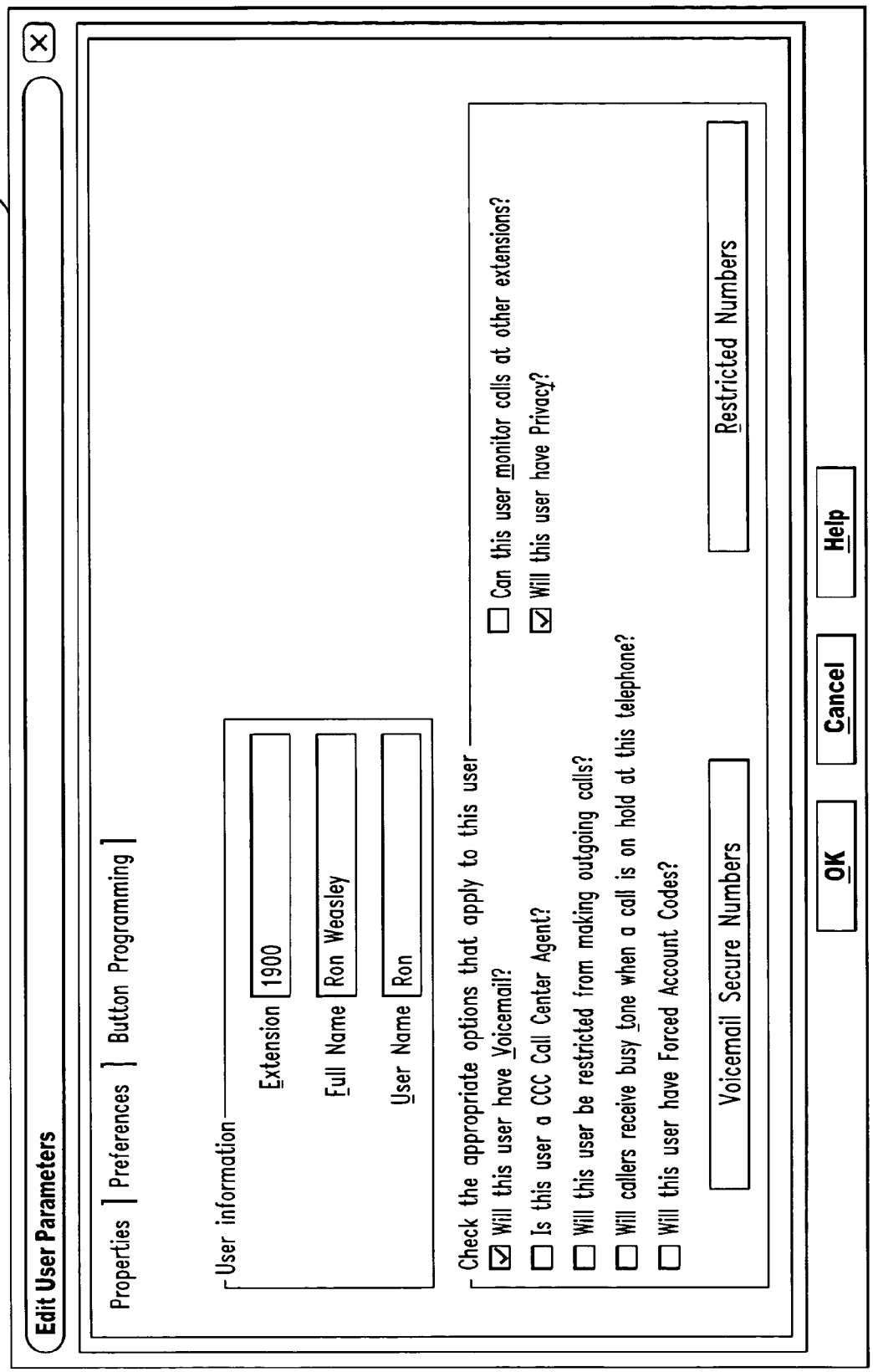
FIGS. 11A and 11B illustrate an exemplary edit user parameter dialog box that allows a user endpoint to be modified to correct a conflict error.
Figure 11B:
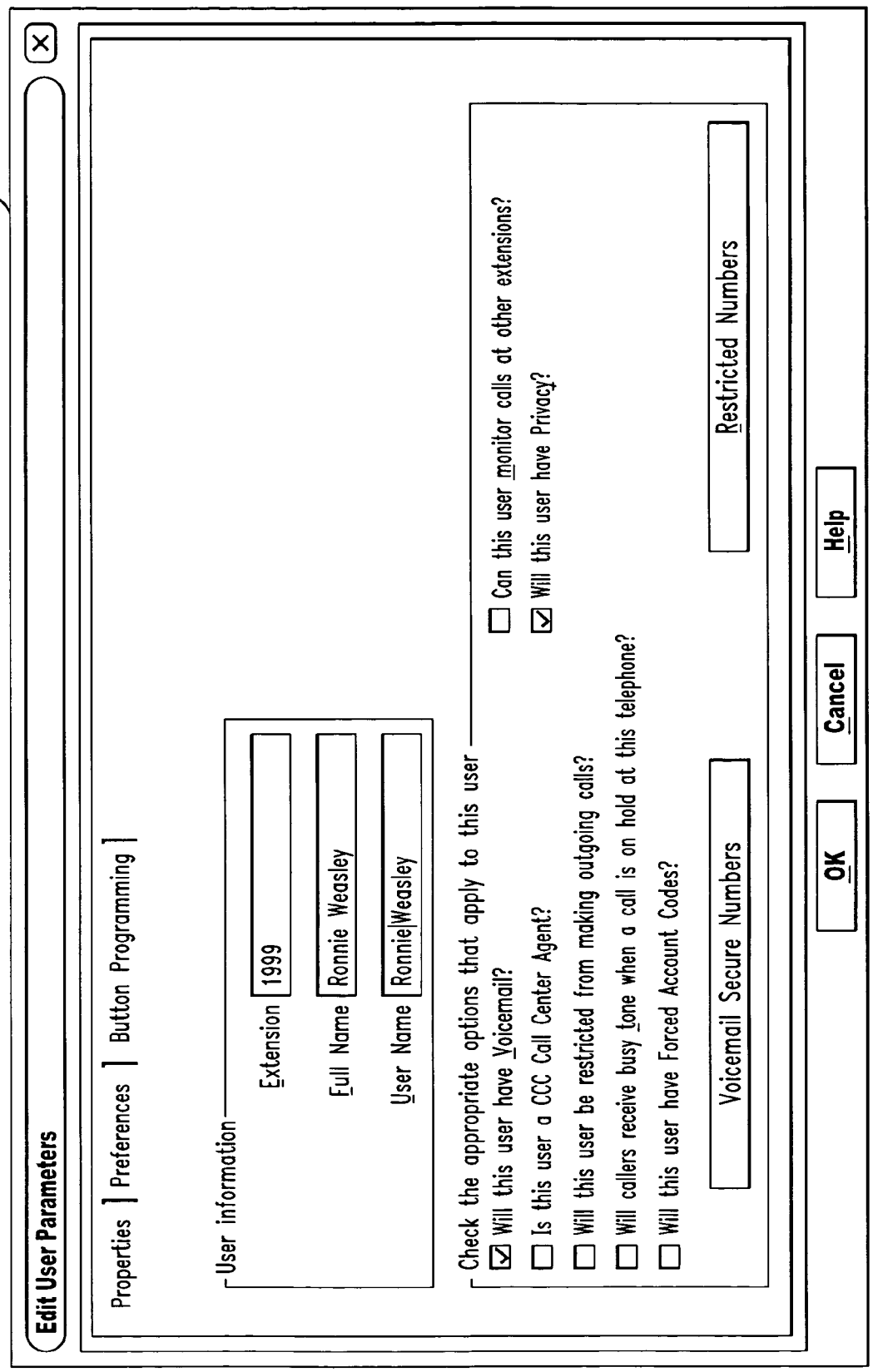

FIGS. 11A and 11B illustrate an exemplary edit user parameter dialog box 1100 that allows a user endpoint to be modified to correct a conflict error. FIG. 11A illustrates the edit user parameter dialog box 1100 before correction of the error, and FIG. 11B illustrates the edit user parameter dialog box 1100 after correction of the error (changing "Ron" to "Ronnie" to provide a unique full name and user name).

Once the error is corrected, the appropriate edit dialogs can be closed and a new error tree 900 can be automatically presented to the administrator with the error removed and any other related errors that have been resolved also removed.

Cascaded Error Resolution and Propagation

This section describes how an error is resolved following a validation, and how the configuration data 250 is revalidated in an iterative fashion. When validation of Item A happens (Level I), an error is produced, the resolution is shown, and depending on type of error (i.e., simple or one of many possible actions), allow modification of different elements. After modification, deletion or change in another system endpoint, such as Item B, validation happens again (Level II). This is the revalidation of newly changed endpoints. Level II becomes like Level I in its own cycle of validation and this can continue iteratively. If the revalidation succeeds at Level N, the changes are filtered back through to Level 1, and all the changes are performed in one cycle without any further interaction from the administrator.

Figure 12:
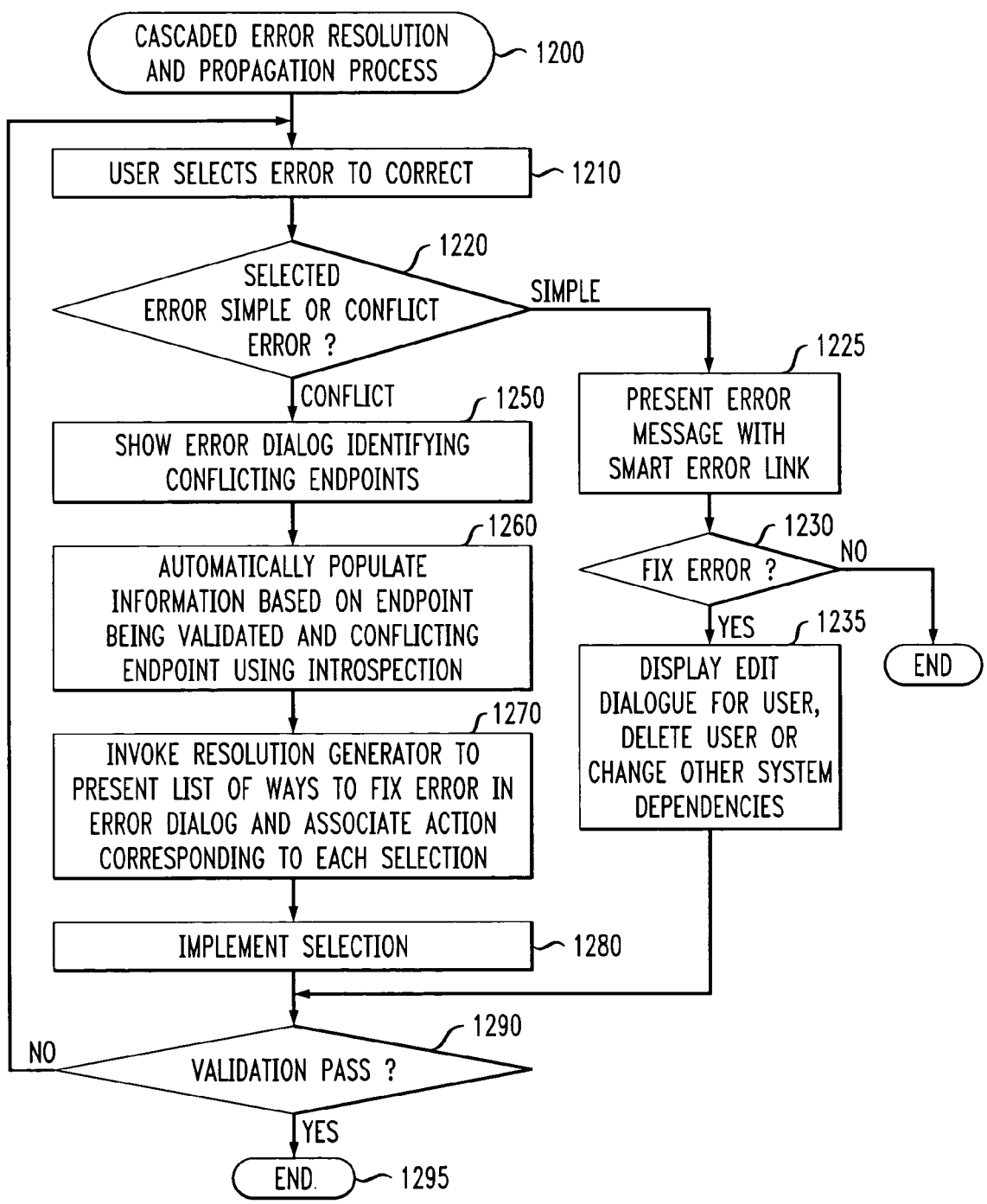
FIG. 12 is a flow chart describing an exemplary implementation of a cascaded error resolution and propagation process that incorporates features of the present invention.

FIG. 12 is a flow chart describing an exemplary implementation of a cascaded error resolution and propagation process 1200. As shown in FIG. 12, the cascaded error resolution and propagation process 1200 is initiated during step 1210 when a administrator selects an error to correct.

A test is performed during step 320 to determine if the administrator selected a simple or a conflict error (depending on error type). If it is determined during step 1220 that the selected error is a simple error, then program control proceeds to step 1225 where an error message is presented to the administrator with a smart error link. If the administrator indicates during step 1230 that he or she wishes to fix the error, the cascaded error resolution and propagation process 1200 can, for example, display an edit dialogue interface for user, delete user or change other system dependencies during step 1235.

If it is determined during step 1220 that the selected error is a conflict error, then program control proceeds to step 1250 where an error dialog is presented indicating the conflicting endpoints. The presented dialog window is automatically populated during step 1260 based on the endpoint being validated and the conflicting endpoint using introspection techniques. A resolution generator generates a list of ways to fix this error during step 1270 and these selections are populated in the error dialog. An action is associated with each selection. Assuming a user conflicts with a hunt group, for example, these selections may be to delete or modify the original user, or to delete or modify the conflicting hunt group. After the administrator makes a choice, the selection is implemented during step 1280. For example, if the administrator chooses to modify the hunt group, a dialog is presented to modify the hunt group.

The configuration data 250 is validated during step 1290. If the validation fails, program control returns to step 1210 and continues in the manner described above. If the validation passes, program control terminates during step 1295. At each level of validation, new changes are processed and revalidated in an iterative fashion (Level II of Validation) and the results are stored. Continuing the above example, if validation of the modified hunt group succeeds, the modified hunt group and user are stored in overall system configuration data 250. The changes are propagated for each changed field to dependant data structure in the system 150.

Figure 13:
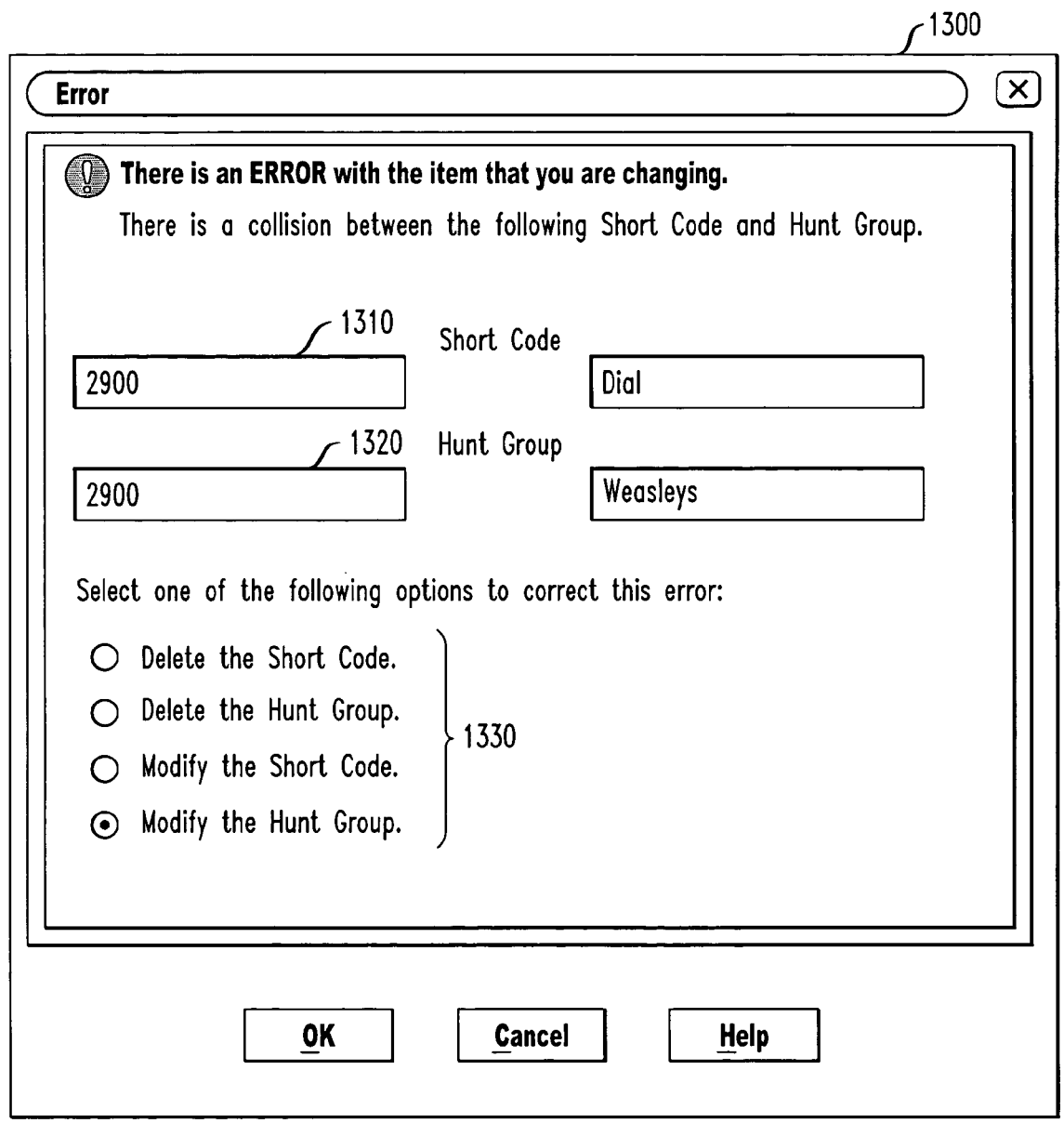
FIG. 13 illustrates an exemplary conflict error dialog message that has been populated with the illustrative conflict error.

For example, if a short code, such as short code 2900, conflicts with hunt group extension 2900 (called Weasleys), the administrator can first be presented with an error tree 900 (FIG. 9) and then a conflict error dialog message 1300, shown in FIG. 13, for the selected error. FIG. 13 illustrates an exemplary conflict error dialog message 1300 that has been populated with the illustrative conflict error. As shown in FIG. 13, the conflict error dialog message 1300 identifies the two endpoints 1310, 1320 that are conflicting, and provides the administrator with a set of options 1330 for correcting the error. In the illustrative embodiment, the administrator has selected to modify the error on the hunt group endpoint, and an appropriate edit hunt group dialog box 1400, shown in FIG. 14, can be presented.

Figure 14:
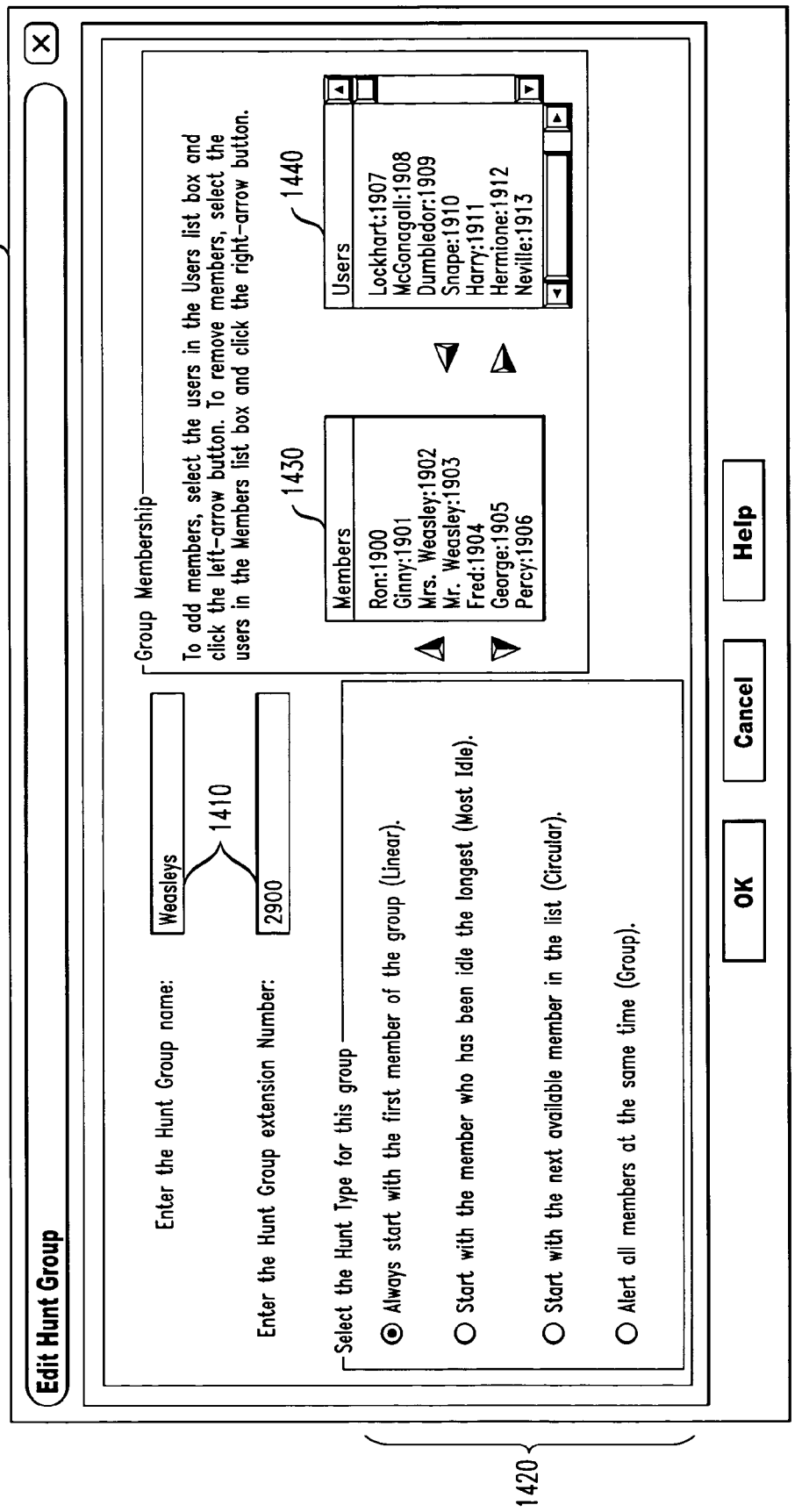
FIG. 14 illustrates an exemplary edit hunt group dialog box that allows a hunt group endpoint to be modified to correct a conflict error.

FIG. 14 illustrates an exemplary edit hunt group dialog box 1400 that allows a hunt group endpoint to be modified to correct a conflict error. As shown in FIG. 14, the exemplary edit hunt group dialog box 1400 includes a field 1410 for entering a desired hunt group, and a section 1420 for selecting the hunt properties of the hunt group. Window 1430 optionally identifies the hunt group members by name and window 1440 optionally identifies the hunt group members by extension number.

In this manner, the administrator can correct one or more properties of the selected hunt group to avoid a conflict. For example, the administrator can change the hunt group extension number from 2900 to 2951 to avoid the detected conflict. The data will be revalidated in accordance with the present invention to determine if the correction creates a new conflict in the iterative manner described above. If validation succeeds at this level, all changes requested up till this point are processed at once without any further input from the administrator. The changes requested are executed in a bottom up fashion starting with the most recent level and working backwards.

Following the error resolution, the error tree is recomputed, as described in the following section; the corrected errors are removed and the configuration data 250 is updated with the modified data.

Faster Recomputation of Error Tree

In this section, techniques are disclosed for presenting accumulated errors to the administrator as an error tree, such that as presented errors are resolved, the error tree is redisplayed by validating only affected elements and not the entire configuration dataset 250. Thus, when accumulated errors need to be shown and grouped according to endpoint, they are shown as a tree 900. When one item is selected and one of its errors is selected and resolved, the error tree 900 is redisplayed by validating only affected elements and not the entire configuration.

Figure 15:
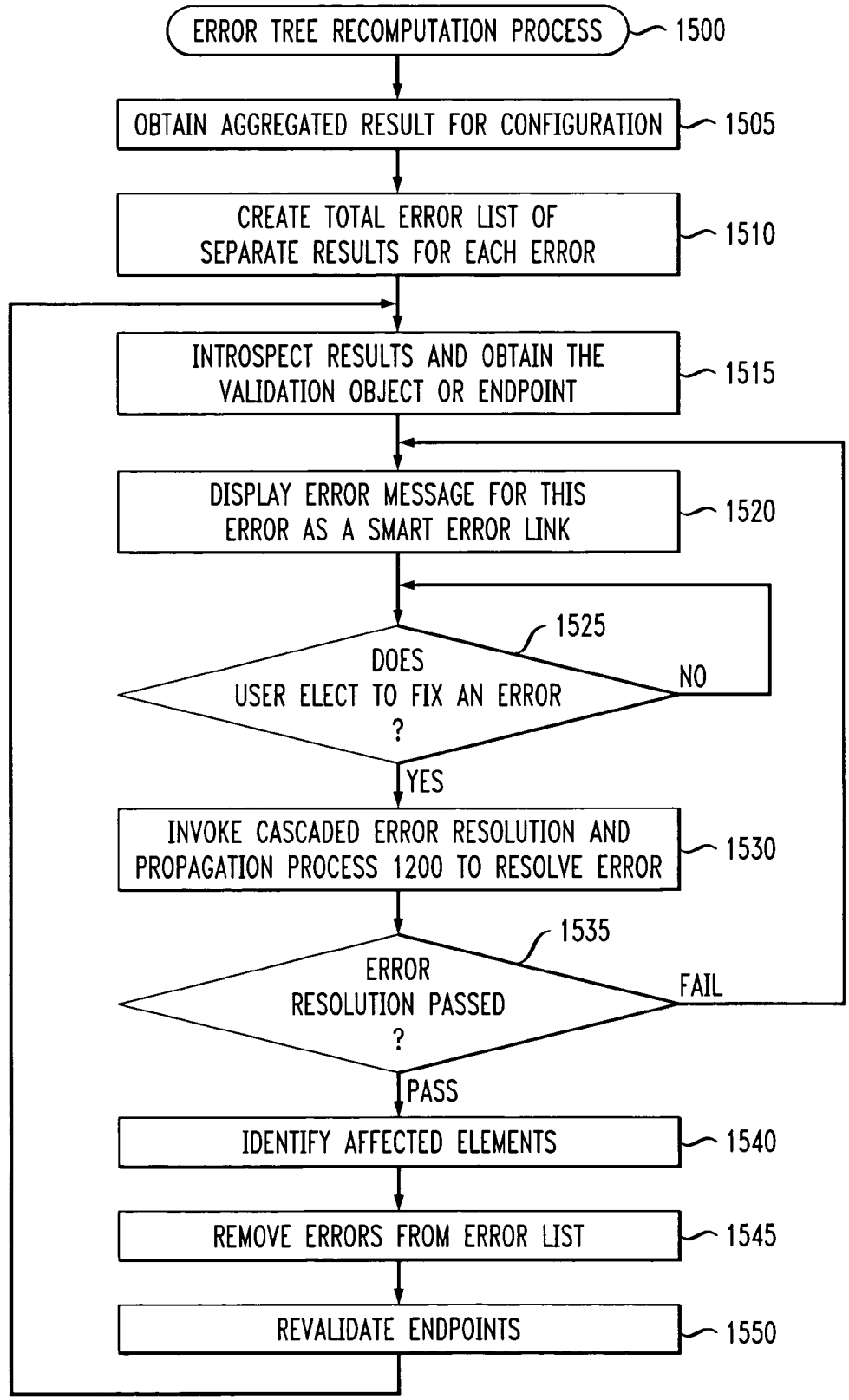
FIG. 15 is a flow chart describing an exemplary implementation of an error tree recomputation process.

FIG. 15 is a flow chart describing an exemplary implementation of an error tree recomputation process 1500. As shown in FIG. 15, the exemplary Error Tree Recomputation Process 1500 initially obtains an aggregated result for the configuration, following a validation, during step 1505. A total error list of separate results is created for each error during step 1510, which results in flattening out the aggregated result tree (GetDiscreetResults( ) method of Result class). The results are introspected and the validation object or endpoint is obtained that was being validated for each result during step 1515. An error message for this error is displayed during step 1520 as a smart error link.

Once it is determined during step 1525 that the administrator has selected to fix an error, E, for an endpoint "A", by highlighting or selecting the error message, E, then program control proceeds to step 1530. During step 1530, the error is resolved, based on the error identifier, proceed to resolve error using the cascaded error resolution and propagation process 1200, discussed above in conjunction with FIG. 12.

A further test is performed during step 1535 to determine if the error resolution passed (by examining dialog state information and other data). If it is determined during step 1535 that the error resolution did not pass, then the same error tree 900 is presented during step 1520. If, however, it is determined during step 1535 that the error resolution passed, then the affected elements are identified during step 1540 by (i) identifying the conflicting item "B," if any; (ii) identifying errors for endpoint "A;" (iii) identifying errors for endpoint "B;" (iv) identifying errors with conflicting endpoint "A;" and (v) identifying errors with conflicting endpoint "B." It is noted that when critical elements, such as an emergency number or dial out code, is changed and the entire system can be revalidated.

In one variation of step 1540, Short Codes have different contexts/uses, as follows:

a. System Wide Short Codes;
   b. Least Cost Routes Short Codes; and
   c. User's Button actions: Override System Wide Restrictions.

In this variation, Step 1540 is enhanced to do the following: (i) identify the conflicting item "B," if any; (ii) identify errors for endpoint "A;" (iii) identify errors for endpoint "B;" (iv) identify errors with conflicting endpoint "A;" (v) identify errors with conflicting endpoint "B;" if Item A or B is of type Short Code; identify parent or Container (Self in case of Configuration; Least Cost Route, or User); and (vi) apply rules through iv for the Short Code's Container as identified in vi. This error identification happens for all the modified items after any error resolution. The errors are removed during step 1545 from step 1540 from the error list from step 1510 to get a new total list of errors. Endpoints A and B and all other modified items are revalidated during step 1545, as follows:

1. a new list of separate results is created for each error, and aggregated result tree is flattened out (GetDiscreetResults( )method of Result class); and
   2. the list of separate results created for each error are added to the error list from Step 1545.

The changed error tree is recreated by adding the errors from above mentioned revalidation.

For example, if a short code 2900 conflicts with hunt group extension 2900 (called Weasleys) (or vice versa), and the administrator resolves this conflict, for example, by selecting ShortCode 2900 and changing Hunt Group Weasely's extension, an updated error tree is presented with validation recomputation done only on ShortCode 2900 and Hunt Group 2900 and no other endpoints (hence, faster).

Program control proceeds to step 1515 and continues in the manner described above, in an iterative fashion, until no more errors are detected or the administrator cancels. After each change the change is propagated to dependent endpoints.

Automatic Error Resolution

In this section, techniques are presented for the automatic correction of certain error types. The present invention recognizes that certain errors can or should be automatically corrected without prompting the administrator. For example, errors pertaining to critical elements, such as an emergency number, or errors that critically impair the system 150 from functioning properly or are dependant on pattern matching between discreet sets of endpoints and must remain in synchronization in order for system to work, should be automatically corrected.

After a validation is done, the errors are accumulated and processed, in the manner described above. Before the error tree 900 is shown, however, there is a check to see if there are any errors to be fixed automatically. The Resolution engine object 740 automatically identifies these errors, using the flag in the error objects 720, and generates the action and executes the action specific to the error. This is all done with no prompting from the administrator and optionally with audit trails. The error tree 900 is reconstructed using an enhanced version of the error tree recomputation process 1500 to accommodate the automatic fix capability.

Figure 16:
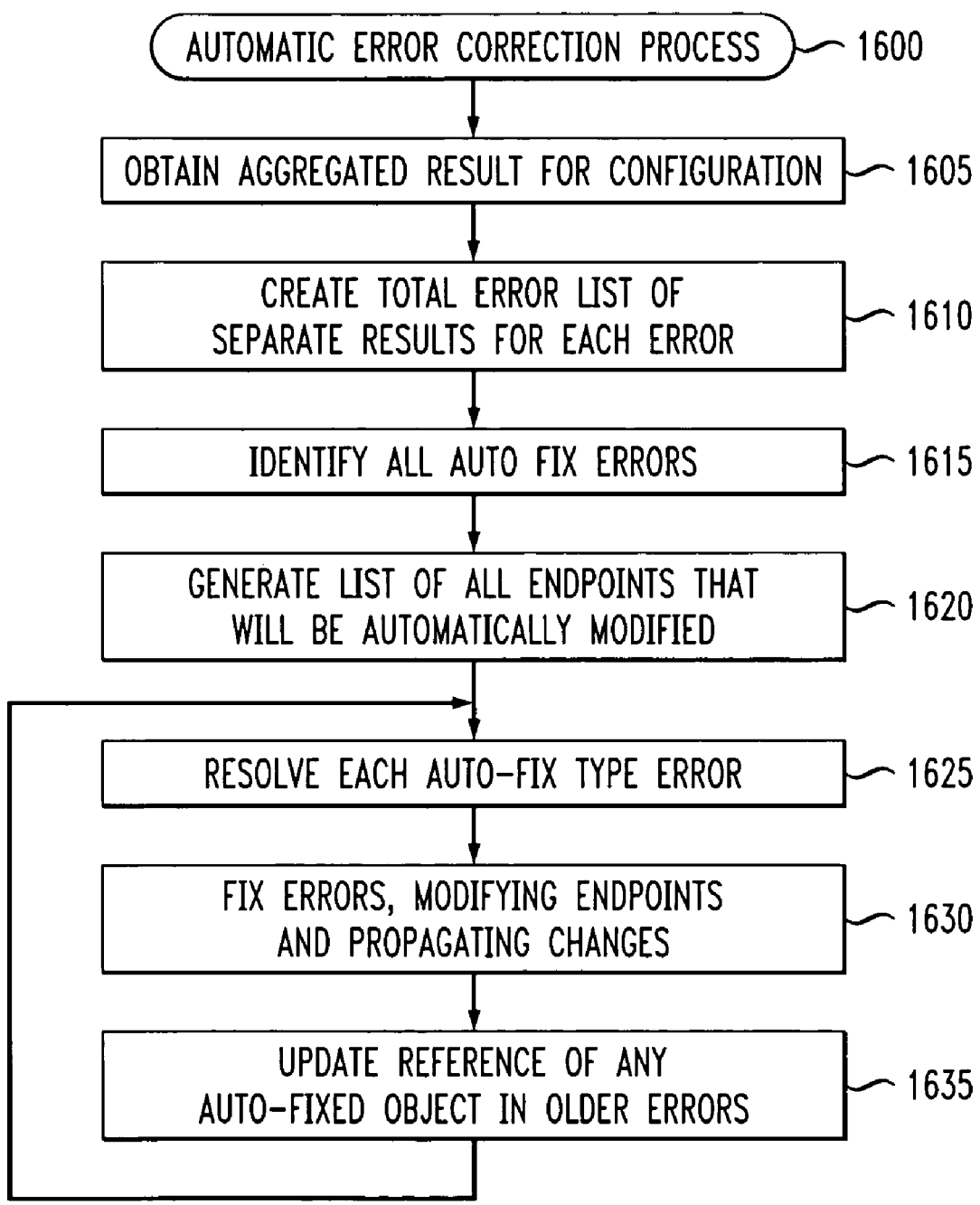
FIG. 16 is a flow chart describing an exemplary implementation of an automatic error correction process incorporating features of the present invention.

FIG. 16 is a flow chart describing an exemplary implementation of an automatic error correction process 1600 incorporating features of the present invention. As shown in FIG. 16, the automatic error correction process 1600 initially obtains an aggregated result for the configuration, following a validation, during step 1605. A total error list of separate results is created for each error during step 1610, which results in flattening out the aggregated result tree (GetDiscreetResults( ) method of Result class). All errors that should be automatically fixed are identified during step 1615.

Thereafter, a list of all the endpoints that will be automatically modified is generated during step 1620 and for each auto-fix type error, a resolution is automatically generated during step 1625.

During step 1630, the errors are fixed, modifying the endpoints within the system and propagating changes. The reference of any auto-fixed object in older errors is updated during step 1635 as this object has changed. This will allow an endpoint having multiple auto-fix errors to be accumulatively corrected. That is, the change is percolated from one auto fix action to another error before its resolution. Program control returns to step 1625 for each error identified during step 1615. For each endpoint in list from step 1620, detect all other errors for the same endpoint and revalidate and reconstruct the error tree 900.

Detecting critical data like Emergency Number or non-compliance with E911 is fixed by:
  a. automatically creating emergency number according to country wherever possible using defaults, without prompting the administrator; and
  b. populating all extensions and users in default E911 zones.

Figure 17:
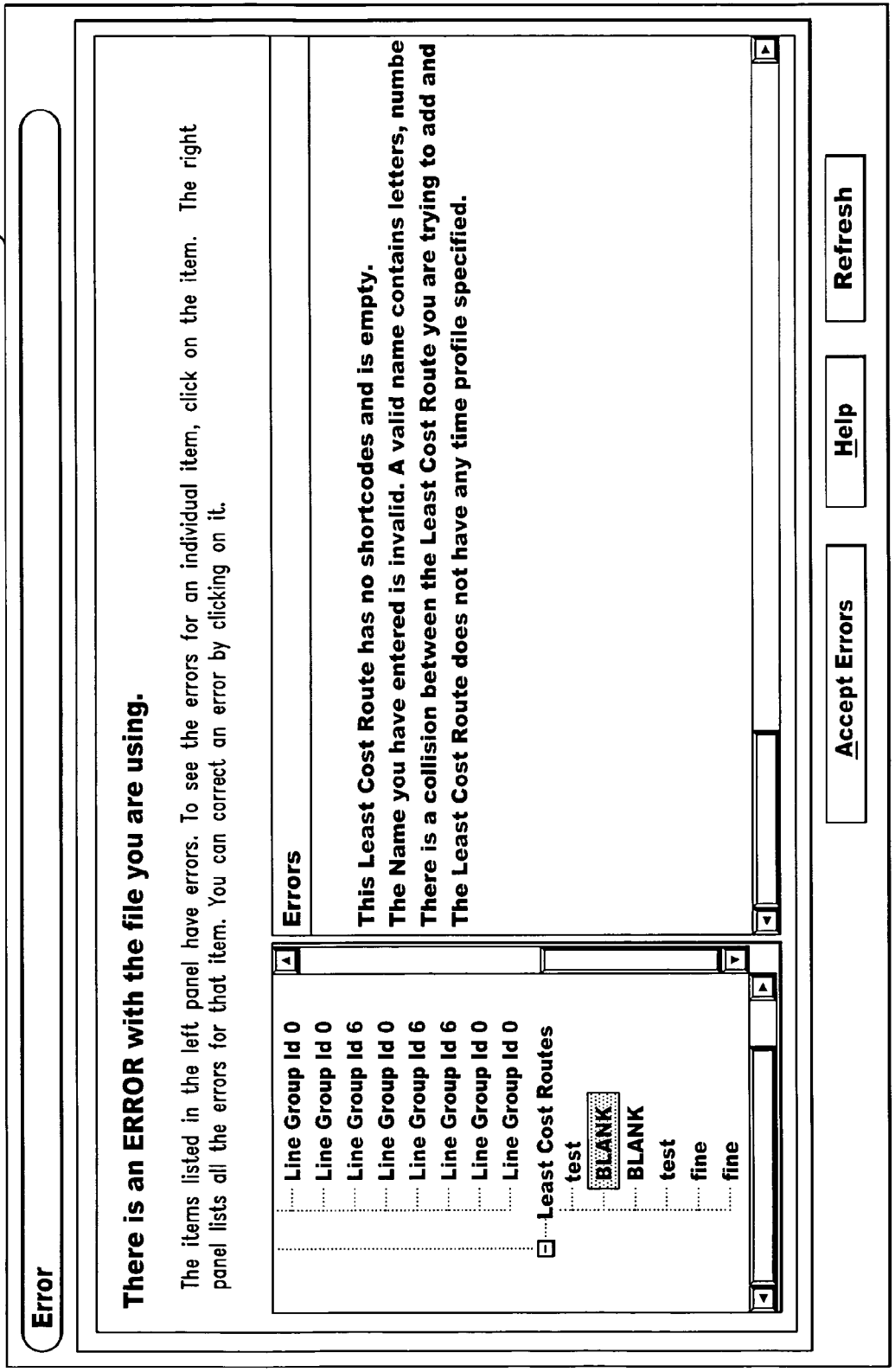
FIG. 17 illustrates an exemplary error tree interface that has been populated with one or more auto-fix errors.

FIG. 17 illustrates an exemplary error tree interface 1700 that has been populated with one or more auto-fix errors. As shown in FIG. 17, the exemplary error tree interface 1700 includes a first section 1710 identifying one or more least cost route (LCR) errors that were detected and a second section 1720 providing additional details on the selected LCR error selected in the first section 1710. For example, the error tree 1700 indicates that the selected LCR error has four errors as shown in the right hand side 1720 of the tree view 1700. The first error, namely, "This Least Cost route has no shortcodes and is empty" is of type Auto-Fix and can be automatically fixed. The fix happens to be to "delete this Least Cost Route." Once this resolution is done, the other three errors should also go away.

In the case of multiple auto-fix errors, if an LCR has a Short Code that is not of a valid feature, it is an Auto-fix type error with the resolution being to "delete this Short Code," and if an LCR is empty and has no Short Codes, it is an Auto-fix type error with the resolution being to "delete this Least Cost Route." Thus, when the administration tool 200 auto fixes the first LCR error, and proceeds to the second error, the administration tool 200 needs to take the updated LCR after processing error one as the input to the second error (and, if applicable, to delete the LCR). Here, there is a different type of Auto Fixing which can also be completely automated if desired wherein a global pattern change will be done to all erroneous endpoints. The faster recomputation will take into account only those endpoints that have been changed or affected by the global auto fix.

Geographic Rules and Validation for Single Global Application

In this section, a framework is provided that allows the administration tool 200 to facilitate the generation or modification of the configuration data 250 by limiting choices, such as hardware choices and administration of those hardware units, to those choices that are appropriate for a given geographic location. For example, while importing a configuration, if the hardware does not match, an error is presented indicating that the hardware is incorrect for the locale.

One feature of the administration tool 200 allows the creation of a system without having to connect to its actual hardware. During creation, the administration tool 200 provides the hardware choices intelligently based on the Geographical rules that were defined for the hardware. Also, when reading an existing file, or online system's configuration, the administration tool 200 checks the hardware against these geographical rules, and provides the input to the administrator. During creation of the switch in the offline mode, the administration tool 200 prompts the administrator for which locale the switch is being setup for, and provides only those choices, which are valid for that locale. In one exemplary implementation, the administration tool 200 provides geographic rules for a primary country, such as the United States, and a different set of rules for the rest of the world (ROW).

For example, FIGS. 18A and 18B, are sample tables storing exemplary hardware (valid daughter cards) for control units in the primary country and rest of world (ROW), respectively. Similar tables can be maintained, for example, for valid Voice Compression Module (VCM) cards and expansion modules in each country or collection of countries.

When creating the switch 150, without having the hardware connected, the administration tool 200 will provide choices based on these geographical rules. All of these modules do not end up as a hardware endpoint in the configuration. For example, a T1 Daughter Card morphs as T1 Line in the system. The administration tool 200 has to compute the Lines, and line numbers to figure out what type of Daughter card is in place in the hardware configuration. Also, the administration tool 200 should determine whether the daughter card is valid for this locale in that particular location, and provide the administrator appropriate information about the hardware configuration.

In this manner, the administration tool 200 of the present invention can serve multiple geographical regions. The administration tool 200 employs rules, and imposes those rules when administering the switch in the off-line mode. Also, when working with the system online, or reading an existing configuration file, the administration tool 200 will make sure that the administration does not have unsupported hardware for the specified locale.

When creating the switch configuration 250 without the hardware, the administration tool 200 should (i) prompt for locale it is being setup; (ii) determine if the locale is an ALAW or MULAW country; and provide hardware configuration choices, as follows:
  1. Mulaw country: T1 Daughter Card, DS Modules
  2. ALAW country: E1 Daughter Card, DS, and DT Modules
  3. CALA region: E1R2 Daughter Card, DT modules
  4. Create appropriate lines for locale.

Similarly, when reading in an existing configuration file, or online switch, the administration tool 200 should: (i) obtain the locale; (ii) compute lines; (iii) create daughter cards; (iv) validate daughter cards for locale based on the rules specified; and (v) provide an input if errors are detected.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:

detecting one or more errors arising from configuration data of a private branch exchange switch that fails to comply with one or more rules, wherein the one or more errors are detected based on the configuration data of the private branch exchange switch failing to comply with a geographic rule that identifies hardware for a given geographic locale of the private branch exchange switch;

automatically correcting the configuration data of the private branch exchange switch when the one or more errors are recognized to belong to a type of errors that are automatically correctible;

correcting the configuration data of the private branch exchange switch based on a user input received via an interface for error correction that is presented to the user, wherein the configuration data of the private branch exchange switch is corrected based on the user input when the one or more errors are not recognized to belong to the type of errors that are automatically correctible; and validating the configuration data of the private branch exchange switch after the configuration data of the private branch exchange switch is corrected.

2. The method of claim 1, wherein the one or more rules include at least one syntactic rule.

3. The method of claim 1, wherein the one or more rules include at least one conflict rule.

4. The method of claim 1, wherein the one or more errors comprise a simple error and wherein the interface provides an error indication with a smart error link.

5. The method of claim 1, wherein the one or more errors comprise a conflict error and wherein the interface identifies conflicting endpoints.

6. The method of claim 5, wherein the interface permits the user to correct at least one conflicting endpoint.

7. The method of claim 1, wherein the configuration data includes data object that inherited a property through application of a template to the data object.

8. The method of claim 7, further comprising the step of maintaining a list of data objects associated with the template.

9. The method of claim 8, further comprising the step of updating the data object when the template is updated.

10. The method of claim 1, wherein the private branch exchange switch includes an Internet Protocol (IP) telephony feature.

11. The method of claim 1 wherein the one or more errors are presented in a hierarchical error tree, and wherein the one or more errors are detected based on the configuration data of the private branch exchange switch failing to comply with the one or more rules.

12. The method of claim 11, wherein the hierarchical error tree is redisplayed following a change by validating only affected elements.

* * * * *